(12) United States Patent
Gammons

(10) Patent No.: US 10,353,538 B2
(45) Date of Patent: Jul. 16, 2019

(54) USER INTERFACE FOR IMPROVING THE FINDABILITY OF CONTEXTUALLY RELATED DATA ELEMENTS IN A 3D DATA VISUALIZATION

(76) Inventor: Richard Gammons, London (GB)

( * ) Notice: Subject to any disclaimer, the term of this patent is extended or adjusted under 35 U.S.C. 154(b) by 404 days.

(21) Appl. No.: 13/824,568

(22) PCT Filed: Sep. 20, 2011

(86) PCT No.: PCT/GB2011/051772
§ 371 (c)(1),
(2), (4) Date: Mar. 18, 2013

(87) PCT Pub. No.: WO2012/038742
PCT Pub. Date: Mar. 29, 2012

(65) Prior Publication Data
US 2013/0185642 A1     Jul. 18, 2013

(30) Foreign Application Priority Data
Sep. 20, 2010  (GB) .................. 1015720.4

(51) Int. Cl.
*G06F 3/048* (2013.01)
*G06F 3/0481* (2013.01)
(Continued)

(52) U.S. Cl.
CPC ........ *G06F 3/04817* (2013.01); *G06F 3/0482* (2013.01); *G06F 3/04855* (2013.01); *G06F 2203/04802* (2013.01)

(58) Field of Classification Search
CPC .............. G06F 3/04815; G06F 3/0482; G06F 17/30126; G06F 17/30994;
(Continued)

(56) References Cited

U.S. PATENT DOCUMENTS 6,335,737 B1   1/2002  Grossman et al.
6,466,237 B1 * 10/2002  Miyao .................. G06F 3/0483
                                                   707/E17.029

(Continued)

FOREIGN PATENT DOCUMENTS

| EP | 2 204 721 A2 | 7/2010 |
| JP | 2009159197 A | 7/2009 |
| WO | 2008/033835 | 3/2008 |

OTHER PUBLICATIONS

Cone Trees: Animated 3D Visualizations of Hierarchical Information, by Robertson et al., published Apr. 1991 in Proceedings of the SIGCHI Conference on Human Factors in Computing Systems, pp. 189-194, ACM, New York, NY, USA.*

(Continued)

*Primary Examiner* — Mahelet Shiberou
(74) *Attorney, Agent, or Firm* — Ware, Fressola, Maguire & Barber LLP

(57) ABSTRACT

A user interface method comprises: causing a plurality of first objects to be displayed; causing one or more second objects to be displayed, each second object associated on the display with one or more of the first objects; and, in response to an input, causing at least one of the first objects to be displayed with decreased prominence and causing at least one second object that is associated with the first object to be displayed such that the relative decrease in prominence of the second object, if any, is less than the relative decrease in prominence of the first object.

25 Claims, 14 Drawing Sheets

(51) Int. Cl.
*G06F 3/0482* (2013.01)
*G06F 3/0485* (2013.01)

(58) Field of Classification Search
CPC ......... G06F 17/30991; G06F 17/30772; G06F 17/30572; G06F 17/30769–30775; G06F 17/30058–30064; G06F 9/4443; G06F 3/048
See application file for complete search history.

(56) References Cited

U.S. PATENT DOCUMENTS

| | | | | |
|---|---|---|---|---|
| 6,662,177 | B1* | 12/2003 | Martino | G06F 17/30817 |
| 2002/0054164 | A1* | 5/2002 | Uemura | G06F 3/04815 |
| | | | | 715/848 |
| 2003/0218641 | A1* | 11/2003 | Longobardi | 345/853 |
| 2005/0057497 | A1* | 3/2005 | Kawahara | 345/157 |
| 2005/0091596 | A1* | 4/2005 | Anthony et al. | 715/712 |
| 2006/0020904 | A1* | 1/2006 | Aaltonen | G06F 3/048 |
| | | | | 715/850 |
| 2006/0048076 | A1* | 3/2006 | Vronay | G06F 3/0482 |
| | | | | 715/850 |
| 2006/0190817 | A1* | 8/2006 | Banks | G06F 3/0481 |
| | | | | 715/209 |
| 2008/0066010 | A1 | 3/2008 | Brodersen et al. | |
| 2008/0295037 | A1* | 11/2008 | Cao et al. | 715/852 |
| 2008/0307343 | A1 | 12/2008 | Robert et al. | |
| 2008/0309614 | A1 | 12/2008 | Dunton et al. | |
| 2009/0113352 | A1* | 4/2009 | Gotcher | G06F 3/04817 |
| | | | | 715/854 |
| 2009/0172596 | A1 | 7/2009 | Yamashita | |
| 2010/0131881 | A1* | 5/2010 | Ganesh | G06F 17/3089 |
| | | | | 715/769 |
| 2011/0043696 | A1* | 2/2011 | Onogi | H04N 5/44543 |
| | | | | 348/564 |
| 2011/0159956 | A1* | 6/2011 | Itskov | G06F 3/04815 |
| | | | | 463/31 |
| 2012/0023453 | A1* | 1/2012 | Wagner | G06F 3/04886 |
| | | | | 715/848 |

OTHER PUBLICATIONS

The Authoritative Dictionary of IEEE Standards Terms, 7th Ed., IEEE Press, Feb. 2007.*

"Cat-a-Cone: an interactive interface for specifying searches and viewing retrieval results using a large category hierarchy," by Marti A. Hearst and Chandu Karadi. In Proc. of the 20th annual international ACM SIGIR conference (SIGIR '97), ACM, New York, NY, USA, 246-255. Jul. 27-31, 1997. (Year: 1997).*

Coverflow clone; Weber Design Labs web page; www.webrdesignlabs.com/blog_files/itunes/iTunesAlbumArt.html; retrieved on Mar. 28, 2013.

Apple Inc. Coverflow; Apple ITunes webpage; www.apple.com/itunes; retrieved on Mar. 28, 2013.

Coverflow clone; Yofla web page; http://www.yofla.com/flas/coverflow; retrieved on Mar. 28, 2013.

Cooliris; Cooliris web page; http://www.cooliris.com; retrieved on Mar. 28, 2013.

Cooliris About; Cooliris web page; http://www.cooliris.com/about; retrieved on Apr. 5, 2013.

Cooliris Help; Cooliris web page; http://www.cooliris.com/support; retrieved on Apr. 5, 2013.

* cited by examiner

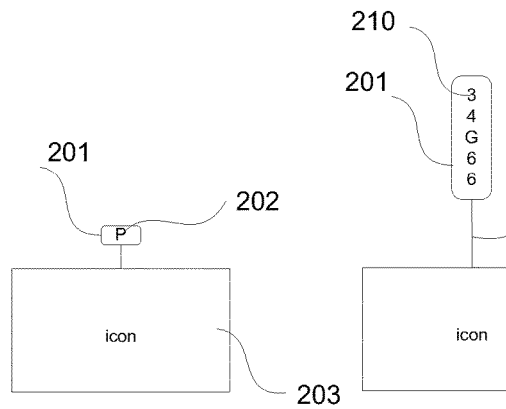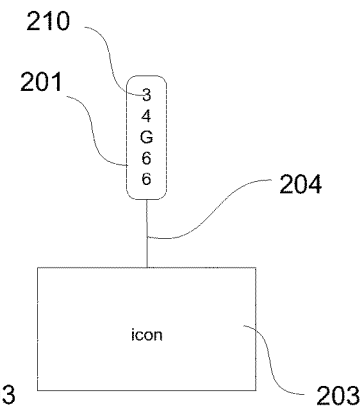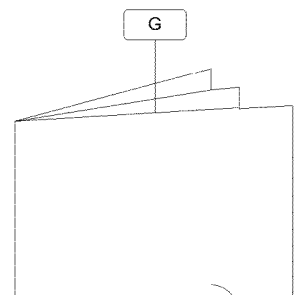
Fig 2a    Fig 2b    Fig 2c
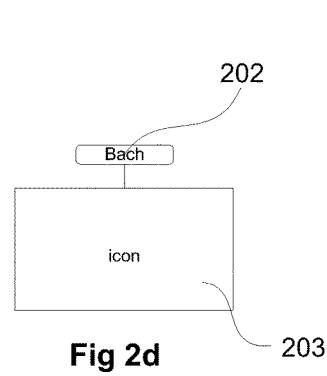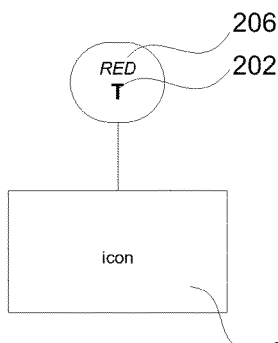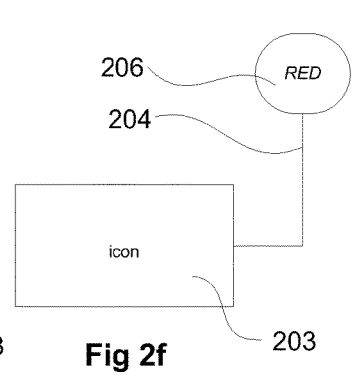
Fig 2d    Fig 2e    Fig 2f
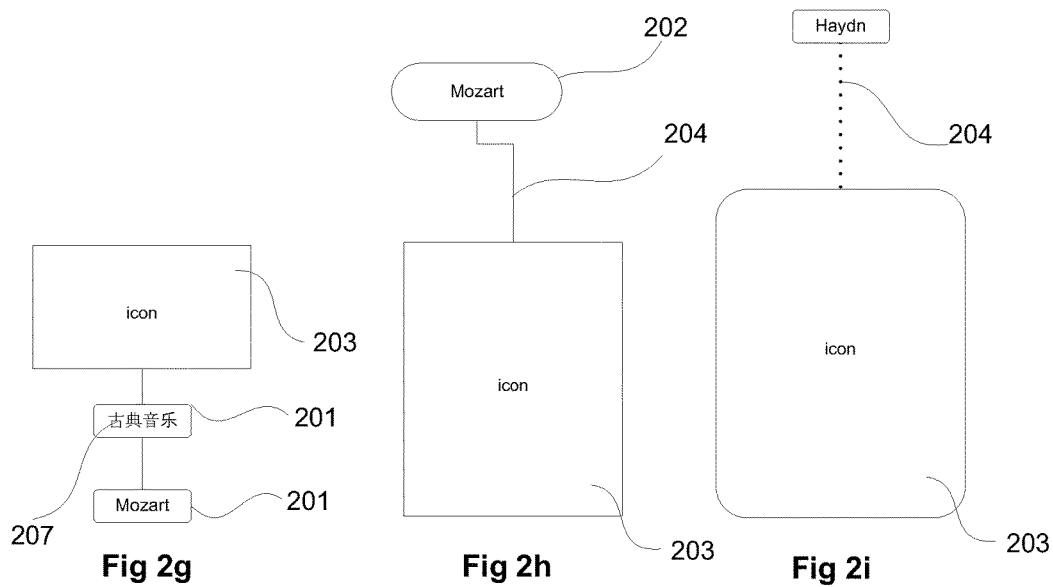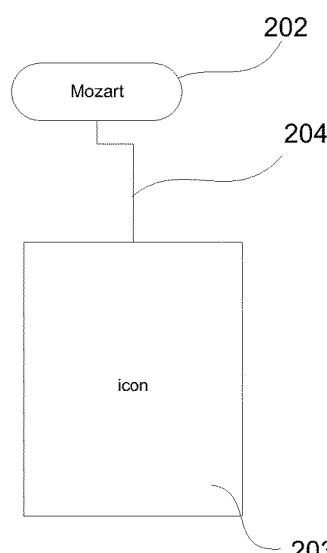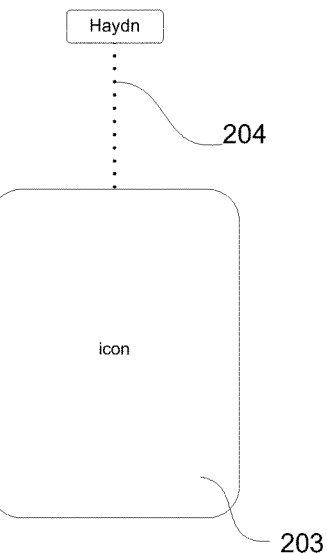
Fig 2g    Fig 2h    Fig 2i

USER INTERFACE FOR IMPROVING THE FINDABILITY OF CONTEXTUALLY RELATED DATA ELEMENTS IN A 3D DATA VISUALIZATION

FIELD

The invention relates to a user interface and, in particular, the findability (locating, accessing, selecting and display) of contextually related and hierarchically grouped data elements and information.

BACKGROUND

Many sophisticated GUI's (Graphical User Interface) and display systems have attempted to cope with the problem of making contextually related and sequentially or hierarchically organised data and information 'findable' in a visually intuitive, meaningful and user accessible way particularly when displaying many grouped visual digital data elements representing categories, directories, folders, files and the navigational or functional elements of a website, application or operating system. Traditional displays however, must severely limit the number of data elements that can be displayed on a screen without visually confusing the user. In this patent the visual representations of such data elements to be displayed to a user on a screen, including but not limited to those just listed, will be referred to as 'icons'. The use of the words 'screen' or 'display' will mean any device that actively or dynamically presents digital data visually to a user and with which the user may interact using typically a pointing device such as a mouse, touch sensitive screen or other user interactive device.

From the users perspective icons can represent, often in a simple stylised way, individual or grouped multimedia items such as video and audio items, photo's, retail items such as books or hotels, personal information items such as contacts etc. They may also represent user interface 'windows', website links (URLs), process control elements, electronic program guide (EPG) data or video game elements or indeed any individual data element that a user may need to view or interact with on a screen. In all these cases the icons are visual links to static or functional (control) data elements residing within or connected to the storage and processing elements of the equipment being used. Such icons may represent nodes in a data tree from which a user can select a series of static or active elements within different levels of the tree to locate a particular element or functional goal. This search may be done in a structured, goal oriented way or in a more random 'browsing' fashion.

A typical presentation of such icons to a user could be the arrangement on a screen of the results of a user database query. Since the beginnings of such screen data presentations, one of the principle methods to display results has been in a manner resembling a printed paper catalogue: Multiple icons or graphic data elements are laid out on the users screen as one or more consecutive 'pages' or screens populated with a static 'flat' 2D linear array consisting of rows and columns of icons containing images, symbols and/or text frequently with additional descriptive or title text adjacent to the icons. With such presentations a user may normally view only one page or screen at a time. FIG. 1a, indicates the flat 2D linear array approach.

More recently methods have been revealed in which icons not only move around the x-y axes of a flat screen but are dynamically resized as if moving in the third 'z' dimension perpendicular to the screen surface. Icons in these displays often appear to follow normal rules of perspective and can appear to move in front of and obscure each other. Typical of this type of icon presentation is the rotating 3d Carousel device which has appeared in many forms and suffers from similar problems common to the 2d arrangements described above: with more than just a few icons in a carousel, only those icons at the 'front' of the device are clearly visible—those at the sides and towards the rear are reduced in size and stacked on top of each other concealing some or all of their contents and any contextual boundaries or relationships between adjacent and non adjacent icons. FIG. 1c demonstrates this type of carousel arrangement.

Even in those dynamic 3d systems that provide a facility to reveal individual title or descriptive information about each icon as it is 'moused' over by the users cursor, the same failing is apparent: It is extremely difficult in a reasonable time to establish the contextual boundaries and relationships between adjacent and non adjacent icons and groups of related icons in such a display and thus visually locate areas of the presentation where icons of relevance to the user may be found. This creates a substantial load on the users cognitive and memorising abilities. User success with such systems is often a matter of chance. Anecdotal evidence and data derived from usability studies suggest users can feel overwhelmed or suffer from 'cognitive overload'. This failing of such prior art can often result in wasted time, frustration and users giving up before fulfillment is reached. In a commercial environment this can represent lost sales and in more critical applications the consequences can obviously have a far greater importance.

Recent dynamic 3D (i.e. having visual depth cues such as apparent or 'virtual' perspective, depth and motion) displays employing such moving 'streams' or 'trains' of multiple icons have enabled users to browse through a continuous linear or a rotating 'Carousel' presentation display in which the arrangement of icons can move under user or system control. In such presentations the icon streams are either looped or non-looped: Looped icon displays include continuous and circular 'carousels' or linear streams of icons with provision for those icons that stream off one side of the screen to reappear from the other side of the screen. Non-Looped displays do not provide for icons to reappear—the user must move the icon stream in the reverse direction to review icons. Two of the most prominent examples to date of 3D icon presentations are the 'linear' style presentations of iTunes 'Coverflow' (Apple Inc.) (see FIG. 1d) and the open source 'Cooliris' (FIG. 1e) which have appeared recently on websites and other applications. Both display methods employ linear, non looped user controlled single or multilayered arrays, streams or 'walls' of icons, often numbering in the hundreds, arranged either like a spread out 'deck of cards' flowing from one side of the screen to the other under user control or a multilayered flat wall of images streaming towards and past the user. The 'Coverflow' style 'deck of cards' arrangement has a central position in the stream where icons enlarge and spacing between icons increases causing the 'deck' to appear to open out thus allowing each icon in turn to be presented to the user in a 'front facing' position, fully revealing its contents. In this way the user can examine in a serial manner, each icon in the display. With such systems the user generally controls icon movement by means of a 'mouse' or other pointing device employing a clicking and dragging method or more recently with a touch screen. With the Coverflow arrangement, unless the number of icons is small, icon visibility to either side of the central position become more and more restricted as icons are stacked up on each other increasingly concealing the contents of those behind them. With a small number of icons it is possible to give each icon a title or very short description but as the number of icons increases the display of descriptive or title text is usually restricted to a single front position only. Alternatively a small 'pop-up' text window (sometimes known as a 'tool-tip') appears as the user's cursor is positioned over individual icons (a technique known as 'mousing' over). With the flat moving array arrangement typified by 'Cooliris', the icon array moves as a multi-level wall of icons under the users control.

Findability—The primary problem for users with all such currently disclosed flat, 2D or 3D linear or looped multi-icon presentations is a lack of visibility of the icons, particularly when there are a large numbers of them overlaying each other as demonstrated in FIGS. 1b, 1c and 1d. More particularly, the lack of visible contextual boundaries between individual icons or groups of icons within the whole array gives the user no clues as to where to look for specific icons or groups of icons as seen in FIG. 1b. This often critical factor we will refer to as the 'findability' problem. A specific example illustrates the point: A user issues a query or search on a system containing a catalogue of classical music items. The search is for Chamber Music string Quartet recordings. Typically the results might be presented to the user as several pages of icons, one page at a time, representing such works by all composers in the catalogue (FIG. 1b indicates the problem). The first issue for the user is how has the system sorted them? Is it alphabetically by composer or is it by title or by some other criteria? Even where the system does use an explicit sorting criteria, the boundaries between the sort criteria elements are almost always not visible or they may be on pages not visible to the user, as can be seen in FIG. 1b. How would the user locate the Chamber Music string quartets of Mozart, or Beethoven? And where are those pages within the whole set of results pages presented to the user. To sum up: The user is unlikely to get any idea of how many icons belong to which composer, how are the results (icons) organised and where are the boundaries between each subset or sub group (in this example 'composers') or on which page they are located. In the case of many consecutive pages of icons in a 2d array, users have little or no idea where to look for relevant results—The user can normally only see one page or screen of icons at any time and it may not be obvious on what basis non adjacent and even adjacent icons have been contextually arranged. They may have to look through all pages to find icons relevant to their task or goal. More generally, icons that are hierarchically organised may be sorted and arranged numerically or alphabetically by title, author, shoe size, colour etc or some other criteria appropriate to the application. However, since only a small subset is visible to the user at any one time it will not be obvious what the relationships are or where the hierarchical boundaries or breaks occur in the other unseen pages of the presentation. Consequently, locating or finding pages with relevant results can be just a matter of chance because the boundaries between different contextual subsets or nodes within the whole group are unmarked and hidden amongst the unseen screen 'pages' or stacked icons in an often irregular and unpredictable manner.

Other 3D devices within the prior art and of even greater sophistication include a parent and child carousel arrangement where each icon in a carousel represents a node in a complex data structure. Selecting an icon (or tree node) in a 'Parent' carousel initiates the creation of a child carousel. The child carousel can then produce even more offspring. This kind of device is typified by U.S. patent application Ser. No. 12/109,530. Whilst having the ability to display a multi level data tree, this device cannot reveal at a glance the contextual boundaries and relationships amongst the icons displayed in any particular carousel for the reasons discussed earlier. (See FIG. 1g)

To sum up, all such multi-icon systems suffer from a single major failing of not indicating to the user at a glance the relationships between adjacent and non adjacent icons and groups of icons within the total of those presented on screen or the likely location of icons that will be of interest to the user. The user may have to visit all icons presented to find a single icon of relevance.

Examples of prior art:
A 'Coverflow' clone can be seen at http://www.weberdesignlabs.com/blog_files/itunes/iTunesAlbumArt.html (Coverflow is a trademark of Apple Inc.)
Apple Inc. Coverflow can be seen by downloading Apple iTunes
Another Coverflow clone http://www.yofla.com/flash/cover-flow/
'Cooliris' can be seen at http://www.cooliris.com/
Existing Patents and applications include:
U.S. Pat. No. 6,335,737 B1 Video Display on a graphical Interface (Jan. 1, 2002)
US 2008295037A1 Method and Apparatus for Generating & 3D Carousel Tree Data Visualisation and Related Device (Nov. 27, 2008 U.S. patent application Ser. No. 12/109,530)

SUMMARY

According to a first aspect of the invention, there is provided a user interface method comprising causing a plurality of first objects to be displayed; causing one or more second objects to be displayed, each second object associated on the display with one or more of the first objects; and, in response to an input, causing at least one of the first objects to be displayed with decreased prominence and causing at least one second object that is associated with the first object to be displayed such that the relative decrease in prominence of the second object, if any, is less than the relative decrease in prominence of the first object.

According to a second aspect of the invention, there is provided a user interface method comprising causing a plurality of first objects to be displayed; causing one or more second objects to be displayed, each second object associated on the display with one or more of the first objects; and, in response to an input, causing the display of objects to change, wherein at least one of the second objects remains fully or partially displayed regardless of whether or not the one or more first objects associated with the second object remain displayed.

According to a third aspect of the invention, there is provided a user interface method comprising causing a plurality of first objects to be displayed, wherein the first objects are arranged in accordance with one or more properties of the first objects; causing one or more second objects to be displayed, each second object associated with one or more of the first objects, wherein each second object provides an indication of a further one or more properties of the one or more associated first objects; and in response to an input, causing at least one of the first objects to be displayed at a changed position and causing at least one second object that is associated with the first object to be displayed at a position such that the association of the first and second objects is maintained.

According to a fourth aspect of the invention, there is provided a computer program comprising instructions which, when executed by a processor, cause the processor to perform a method in accordance with the embodiments of the present invention.

According to a fifth aspect of the invention, there is provided a non-transitory computer-readable medium comprising a computer program comprising instructions which, when executed by a processor, cause the processor to perform a method in accordance with the embodiments of the present invention.

According to a sixth aspect of the invention, there is provided an apparatus configured to perform a method in accordance with the embodiments of the present invention.

According to a seventh aspect of the invention, there is provided user interface apparatus comprising: at least one processor; and memory comprising a computer program, wherein the at least one processor and the memory and the computer program are configured to make the apparatus: cause a plurality of first objects to be displayed; cause one or more second objects to be displayed, each second object associated on the display with one or more of the first objects; and, in response to an input, cause at least one of the first objects to be displayed with decreased prominence and causing at least one second object that is associated with the first object to be displayed such that the relative decrease in prominence of the second object, if any, is less than the relative decrease in prominence of the first object.

Preferred features are defined in the dependent claims.

BRIEF DESCRIPTION OF DRAWINGS

Embodiments of the invention will now be described, by way of example only, with reference to the accompanying drawings, in which:

FIG. 2 (a-i) illustrates a few of the many possible styles and types of icon and linked tags within the scope of the application. More specifically:

FIG. 2a illustrates an icon 203 with linked tag 201 containing a single alphabetic character 202;

FIG. 2b illustrates an icon with link 204 and tag 201 containing multiple alphabetic and numeric characters 210 arranged in a vertical format;

FIG. 2c illustrates a 'folder' style icon 205 that can be used to represent multiple data elements contained within a single tagged icon;

FIG. 2d illustrates an icon with multiple characters in the tag;

FIG. 2e illustrates a tag that is distinguished by colour 206;

FIG. 2f illustrates a coloured tag with 'stem' attached in a different place on the icon;

FIG. 2g illustrates an icon with multiple tags 201 and multiple character sets 207;

FIG. 2h illustrates an icon with a tag of different shape 202;

FIG. 2i illustrates an icon of different shape with a non-visible link;

FIG. 7 illustrates two further embodiments of the invention using concentric or co-axial Tagged icon Carousels.

DETAILED DESCRIPTION

Overview

Figure 1A:
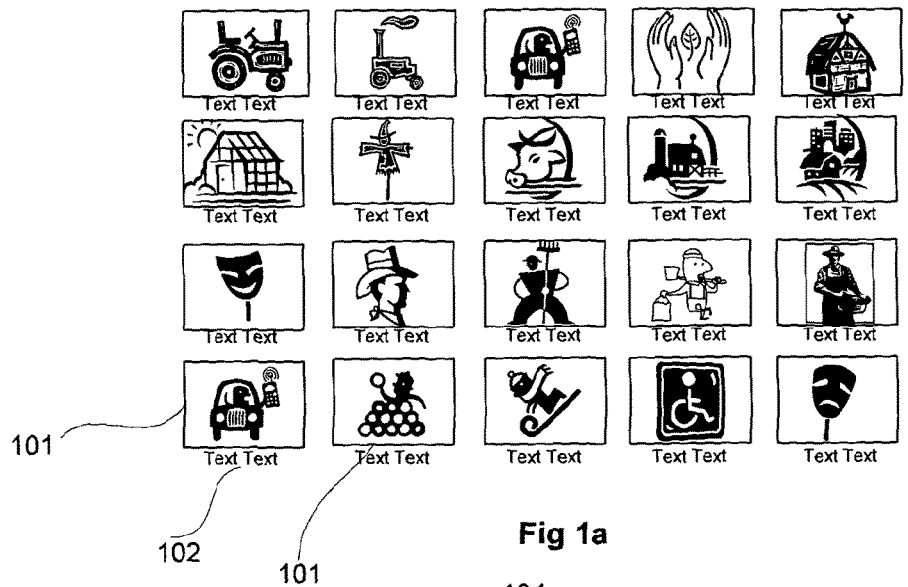
FIG. 1a illustrates a known 'flat' 2d screen of icons 101 and text descriptions or titles 102.
Figure 1B:
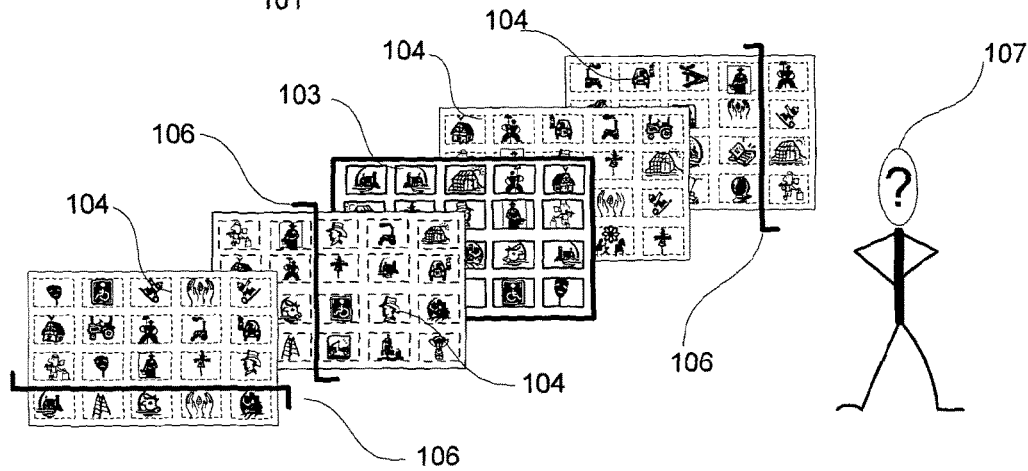
FIG. 1b illustrates a known sequence of several pages or screens of icons and text labels in which only the middle page is currently visible to the user. A number of contextual boundaries are present in the sequence or hierarchy but all are invisible to the user from his current page.
Figure 1C:
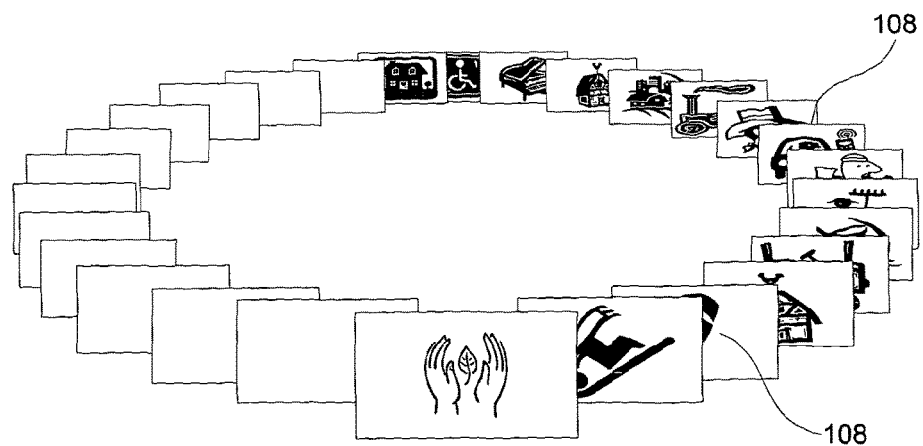
FIG. 1c illustrates a known 'carousel' of icons in which the visual content of almost all icons such as 108 is partly or completely obscured to the user.

The following represents a simplified summary of some embodiments of the invention rather than a detailed overview in order to provide a basic understanding of its functional elements. A more detailed description is presented for a preferred embodiment below.

Some embodiments have a number of 'components' or subsystems
1. The dynamic 'Tagged icon system' which consists of three main subcomponents
   a. The icons
   b. The tags
   c. The optional dynamically annotated slider/scroll bar
2. The optional Multiple, text based list component
3. The reduced or 'contracted Tagged icon system which is an alternative visualisation of the Tagged icon system.
4. The Algorithm which drives the Tagged icon system and which contextually analyses the users purpose/enquiry and decides what tags to display in the Tagged icon system and how to display them The human visual system is much more efficient at recognising concealed or partially concealed visual representations when the manner in which such representations are positioned on a screen is predictably ordered according to a simple rule or hierarchy. Such rules could include but may not be limited to alphabetic or numeric ordering by a contextually relevant property of the visual representations on a user screen. Some embodiments of the invention use this facility to provide a quick, intuitive, and engaging digital or computer based means of dynamically revealing to a user at a glance, the contextual and hierarchical boundaries and relationships between a plurality of icons each representing data elements necessarily presented on a users screen in a static or dynamic, structured and predetermined way and with which a user can interact to perform search, navigation, control and other functions in an intuitive, engaging way. The icons forming part of some embodiments of the invention can be used to represent almost any kind of data element or object, file, navigation element or system control function. Icons to be represented on the users screen may be sorted and arranged in a user selected and/or system predetermined order depending on the application.

The on screen visual representations of such data elements (other than tags) will be referred to in this document as icons. It is intended that all references to icons and the data elements which they represent will, in some embodiments of the invention, include but not be limited to still or moving images, (or still images, text or symbols representing such moving images), thumbnail images, navigation, control or other active functional icons, text objects or placeholders for those objects forming a static or dynamic assemblage on a users display screen. The icons represented on a users screen at any particular time and in this way, in general represent a particular state, search result, tree node, navigation or control state of the host system.

Some embodiments of the invention consist of two principle subsystems. The first is an integrated assembly or visualisation displayed on a users screen comprising a plurality of such icons which are shown on a user's screen associated with annotated tags, to be described below and which are organised on screen in such way that the tags can indicate to a user the contextual, hierarchical and sequential relationships between individual or grouped icons in the assembly. This subsystem of some embodiments of the invention will be referred to as a tagged icon device or assembly. The second subsystem forming a principle part of some embodiments of the invention is a multiple interactive dynamic integrated text based list or word assembly system which displays and mirrors current and previous tagged icon assembly states and contents as text based lists or word assemblies. Such text based lists and word assemblies may in some embodiments of the invention be in a hierarchical or contextually ordered state derived from filtering or sorting operations. Individually, such lists are often referred to by practitioners of the art as 'Jukeboxes'.

To convey contextual and hierarchical structure visually and almost instantly at the users current system state, some embodiments of the invention visually associate or link a symbol or character based 'Tag', forming part of a simple series of hierarchically or sequentially organised Tags on the users screen, with each contextually distinct and hierarchically sequentially ordered icon or icon group displayed to the user.

Tags are generated and ordered on the users screen according to application and/or embodiment specific rules or algorithms that contextually analyse the user's current query or purpose and the system state. Such rules or algorithms will usually be predetermined by the system designers based on a careful analysis of user and system requirements, states, interactions and desired outcomes within the actual application.

Tags so generated together with their linked icons form a powerful series of ordered visual cues contextually appropriate to the user's purpose. Tags may use text, symbols or other visually distinct properties to indicate one or more contextual or hierarchical properties and relationships inherent in the icons presented in the display and relevant to the user's purpose.

Tags are a powerful way of enabling the user to locate specific icons or groups of icons in a more highly targeted, efficient and fulfilling way than hitherto possible. This is particularly true when there are large numbers of icons on the users screen.

The Tags forming part of some embodiments of the invention are not to be considered as mere labels, descriptions or 'titles' for icons they are linked to; their purpose and functionality is much more complex and deep than that. They are a dynamic structure that possesses very simple and yet powerful visual cues enabling users to make rapid context based visual inferences about the hierarchical ordering, location and attributes of adjacent or non-adjacent individual and/or grouped icons in the display. Individual tags in a series visually and dynamically locate specific icons or groups of icons with specific attributes or properties revealed by the contents of the Tag and by relying on the human eye's ability to rapidly recognise patterns in simple visual structures, a series of tags reveals firstly, how their associated icons are sorted or arranged within the whole assembly of icons. In a simple embodiment this could be alphabetic, numeric, by title or size or any other application specific attribute. The tags forming part of some embodiments of the invention also interactively and dynamically reveal icon group boundaries and hence indicate the number of icons in any particular contextual group. Such tags can also reveal where icons or groups may be missing or absent from an assemblage of icons. They can also reveal contextual boundaries between groups of icons.

Such tags to be displayed will always be visible and legible despite the fact that icons to which they are linked or associated may be partially or fully obscured. Such tags can dynamically follow the motion of icons to which they are linked in the assemblage and thus continually reveal contextual and sequential structure for all icon orientations and motions permitted by an embodiment of the invention The presentation to a user of icons and their associated tags, according to some embodiments of the invention, has many possible dynamic or static embodiments under system and/or user control.

User interaction with a working embodiment of the device can be by any suitable means including but not limited to a pointing and clicking device such as a mouse, suitably equipped hand held remote device, suitable interaction with a touch screen, haptic, gesture or voice based control or any other device or system existing or yet to be devised. All such devices will be referred to as 'user interaction devices'. User recognition of icons, groups of icons, associated tags and their state can be reinforced by a visual change of state or highlighting of the associated icons and tags as the users interacts with them. For example, a change of state such as highlighting may be employed to enable a user to recognise those icons that are contextually associated with specific tags in order to then initiate other selection, searching, navigation or system control actions.

The objects referred to as 'tags' each comprise one or more characters, symbols or other contextually distinguishing and hierarchically ordering means, known or yet to be devised. Such means include but are not limited to, alphabetic or numeric characters of any known or yet to be known or devised language. Tags may also use colour, font, shape, size, texture, or other features to provide an engaging and intuitive means to visually indicate the contextual boundaries or hierarchical ordering of one or more properties, values or relationships by which the icons are sorted or organised in the display.

Figure 3A:
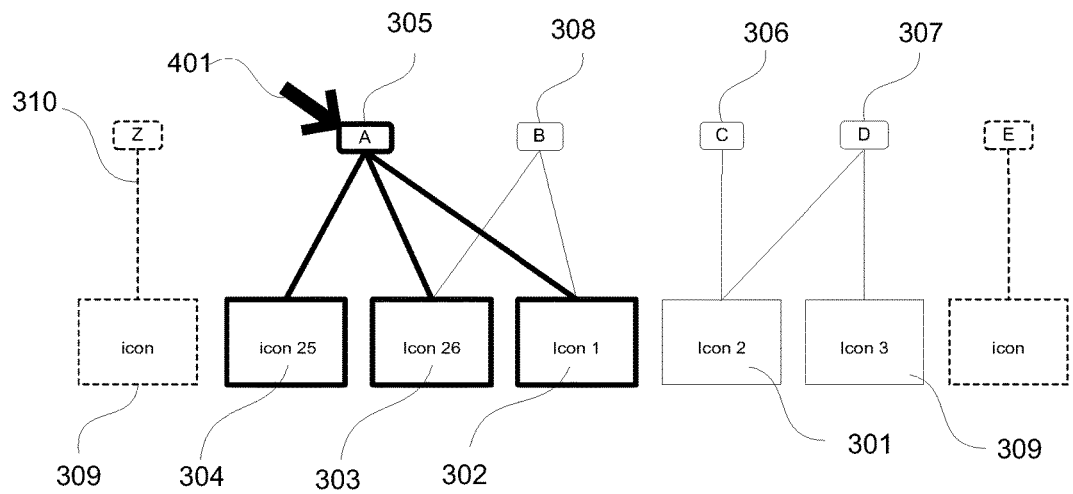
FIG. 3a illustrates 'one to many' tag-icon link or association—A users cursor 401 is seen 'mousing over' tag 305 causing it and the associated three icons 303, 302, 304 to be highlighted. The two icons 303, 302 are also linked to another separate tag 308.
Figure 3B:
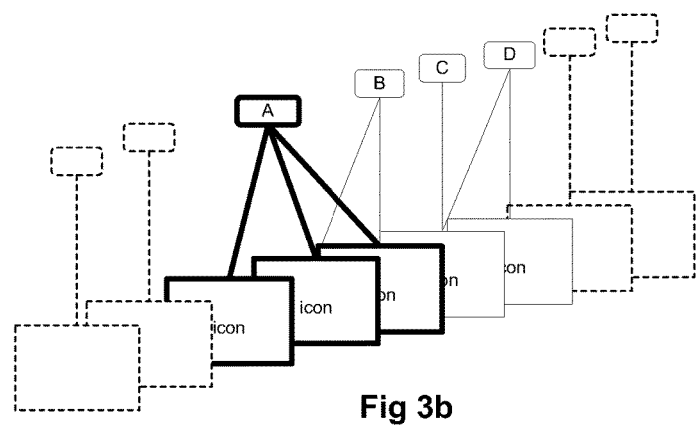
FIG. 3b illustrates the same relationships & linking as in FIG. 3a but as might be seen in a 'tagged icon carousel' embodiment of the invention. It is clear that the content of the icons are partially obscured but the tags and highlighting continue to reveal the associated icons.
Figure 3C:
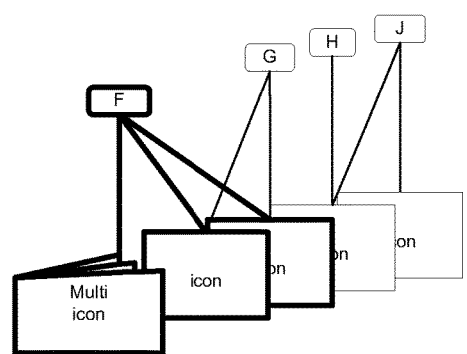
FIG. 3c illustrates a link between a tag and associated icons including a multi-icon.

The association between a Tag and its linked icons can be indicated to a user by highlighting or other obvious visual change of state triggered by a suitable user interaction such as moving the users cursor over a tag (A behaviour known as 'Mousing over'). In the preferred embodiment to be described below, all icons associated with the moused over Tag show a highlight or change of state. Each tag 305 (FIG. 3a) may be visually associated with and linked to one or more adjacent icons 302, 303, 304 in the display in a 'one to many' relationship and will in this way reveal categories, nodes, subsets or other contextual groupings within the icons and the boundaries between them. Each icon 303 (FIG. 3a) may also be associated with more than one tag 305, 308 in a 'many to one' relationship (many tags to one icon)—for example an icon may represent a collection or compilation of music tracks by more than one composer.

A principle and key feature of some embodiments of the invention are their ability to enable users to see at a glance how tags and their associated icons are organised and in this way explicitly and visually present a map of the contextual boundaries between individual icons and groups of icons presented regardless of how many icons are shown on screen. In this way users will be able to visually locate and select almost at a glance, relevant areas where icons of interest will be located. The user can then choose to bring the selected icon or icons into a more prominent or visually 'closer' position from where individual icons can be browsed and an icon of interest selected. This ability to reveal the contextual arrangement and boundaries within the whole display, even though there may be a large percentage of icons with visual content partially or fully obscured by overlying icons, is one of the most significant and unique features of some embodiments of the invention.

Icons and tags may be sorted and displayed by any predetermined or user selected criteria appropriate to a practical application of some embodiments of the invention (such as composer, popularity, size, time of day). The actual choice of sort criteria may be predetermined by the logic built into the system by the designer or the user may choose from a number of offered sort parameters offered by the system and based on the users pre-existing enquiry or purpose and the current state of the system.

Individual Tags may be associated with or linked to more than one adjacent icon and in this respect are serving as a common reference for all icons associated with that particular tag and the property, category, node or parameter it represents. The actual choice of Tag symbols, fonts, characters, colours, sizes etc used in any particular embodiment are not necessarily considered part of the embodiment but will be dictated by the actual application and the artistic and cultural values to be embodied by the design team implementing an application of an embodiment of the invention.

Individual tags and the icons they are associated with may be highlighted and revealed by 'mousing' over them in turn. Furthermore, a user may activate, select or trigger an action on a single icon with a mouse or other user interactive device to progress to another level in the current data or navigation tree or initiate other behaviours including motion of the entire assembly of icons and tags in order to move selected icons to a predetermined position where the user may see their contents in more detail. In this way the user is not required to look through page after page of icons or examine almost all icons presented in order to locate a single icon of interest as would happen with other existing methods. Substantial time is saved and frustration avoided.

A further optional feature of some embodiments of the invention simultaneously enables a user to review and interact with the current and all prior levels in the users present task by means of multiple interactive dynamic text based lists or word assemblies which display and mirror not only the current icons and tag contents but also permit the user to access and interact with all previous levels or nodes encountered in the users current activity. Such lists and/or word assemblies represent either the current or previous nodes or states of the users workflow using the Tagged icon device. A user can return to any such previous Tagged icon assembly state or node and select an alternative item in that node: The Tagged icon assembly will then display the contents of that node and form the beginning of a new search or activity. The use of multiple text based lists and/or word assemblies can be regarded as an interactive text based data tree or 'Path' representation of the user's entire current activity complementing and extending, not merely duplicating the Tagged icon assembly's contents. The integration of the Tagged icon assembly with the multiple dynamic text lists and/or word assemblies is a uniquely powerful method of accessing and selecting individual icons from the contents of a single node or layer whilst maintaining full interactive control over previous levels or nodes encountered.

The multiple text based lists and/or word assemblies are optional and for some embodiments may not be required or may be toggled on or off by system or user interaction.

The tagged icon system(s) and the text based multiple lists and/or word assemblies (called a Jukebox) are to be seen as subsystems of some embodiments of the invention. Each complementing and mirroring the other and the whole assembly providing functionality not possible with either subsystem individually.

A further level of sophistication having uses including EPG's (Electronic Programming guides—for TV, radio and internet) and complex process monitoring and control is the optional display of 'child' Tagged icon systems which 'bud off' from the original parent Tagged icon system under user or system control. Such an enhancement may be used for example, as a display method for monitoring particular areas of complex processes in which icons in the Tagged Icon System actively represent a set of complex sub-system parameters. Each icon and it's associated tags when highlighted could alert a user to certain conditions being achieved in any particular sub-system. Further information about that sub-system state would be revealed by a 'child' Tagged Icon System 'budding off' to display as icons, vital parameters associated with that sub-system's new state whilst still maintaining full visibility of all other subsystem states in the parent (This 'Parent' & 'Child' arrangement can be seen in FIG. 6)

Figure 1D:
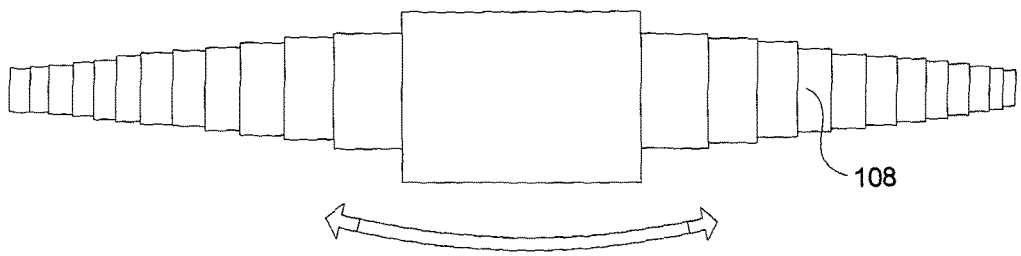
FIG. 1d illustrates a known 'Pack of Cards' or 'Coverflow' style array of icons indicating possible motion of icons. Almost all icons are partly or completely obscured 108 with no indication of contextual boundaries or the beginning and end of the sequence or hierarchy.
Figure 1E:
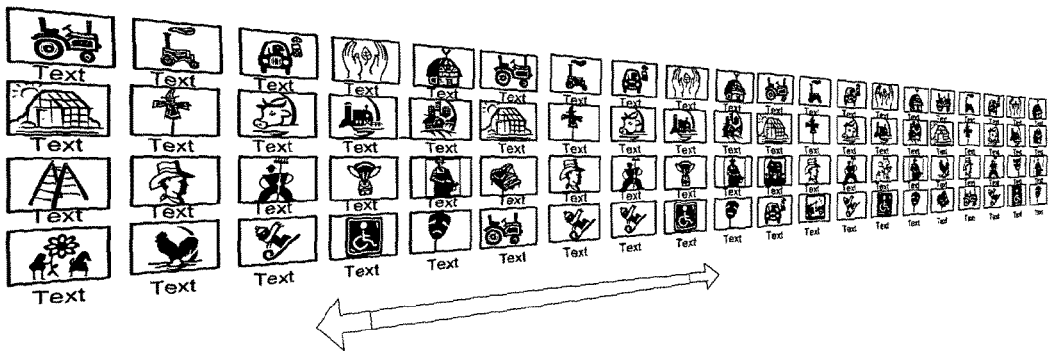
FIG. 1e illustrates a known icon 'wall' showing one possible mode of motion and no visibility of contextual boundaries or the contents of smaller icons.
Figure 1F:
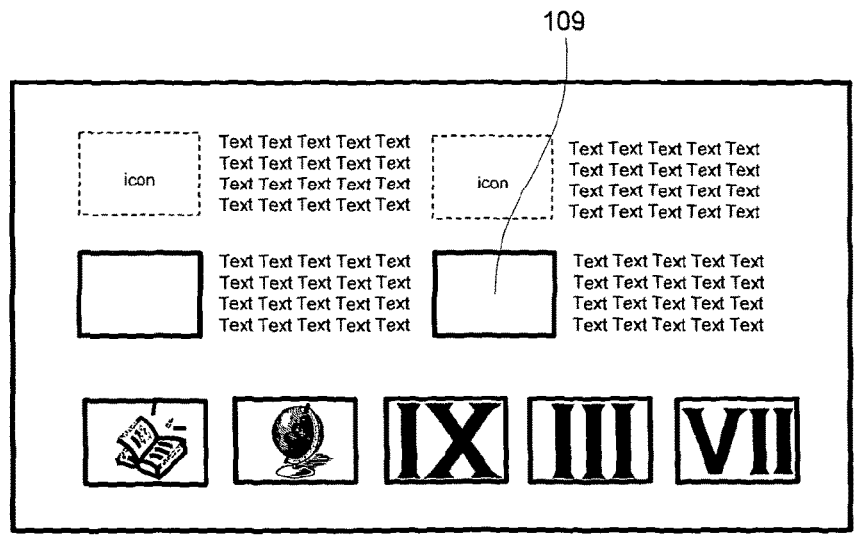
FIG. 1f illustrates a 'traditional' webpage with Thumbnail images (icons) 109 containing different types of content and text.
Figure 1G:
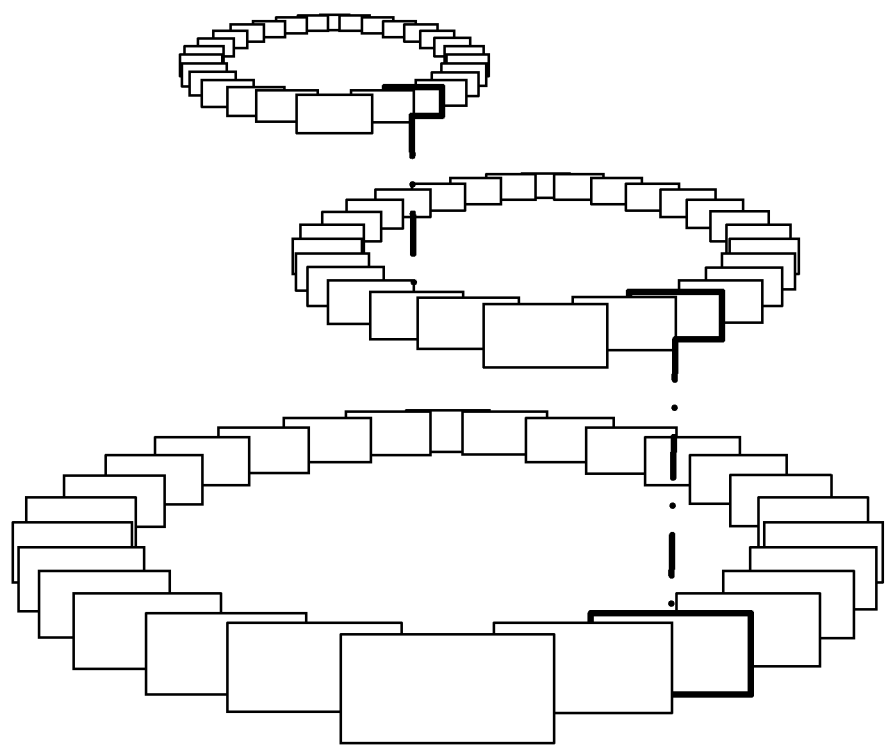
FIG. 1g illustrates a known parent and child carousel arrangement.
Figure 5A:
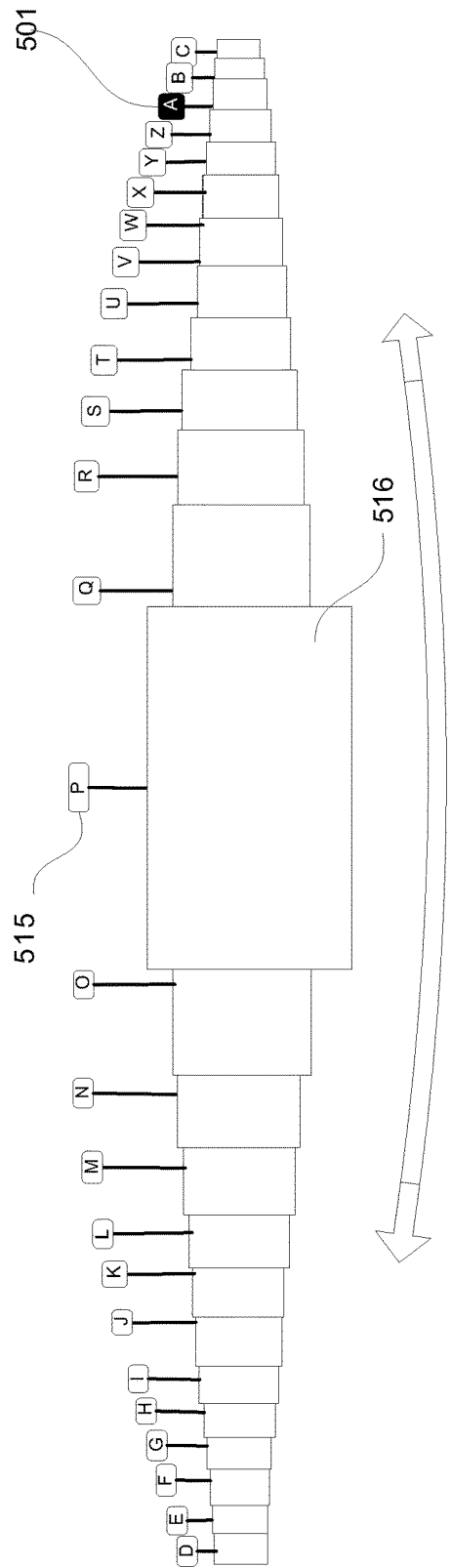
FIG. 5a illustrates a looped 'deck of cards' embodiment of the invention showing associated icons and tags with 'frontmost tag 515 and icon 516. The tags such as 501 (Tag 'A' in FIG. 5 being the first in the looped sequence) clearly reveal the location of associated icons in the sequence in the visualisation.
Figure 5B:
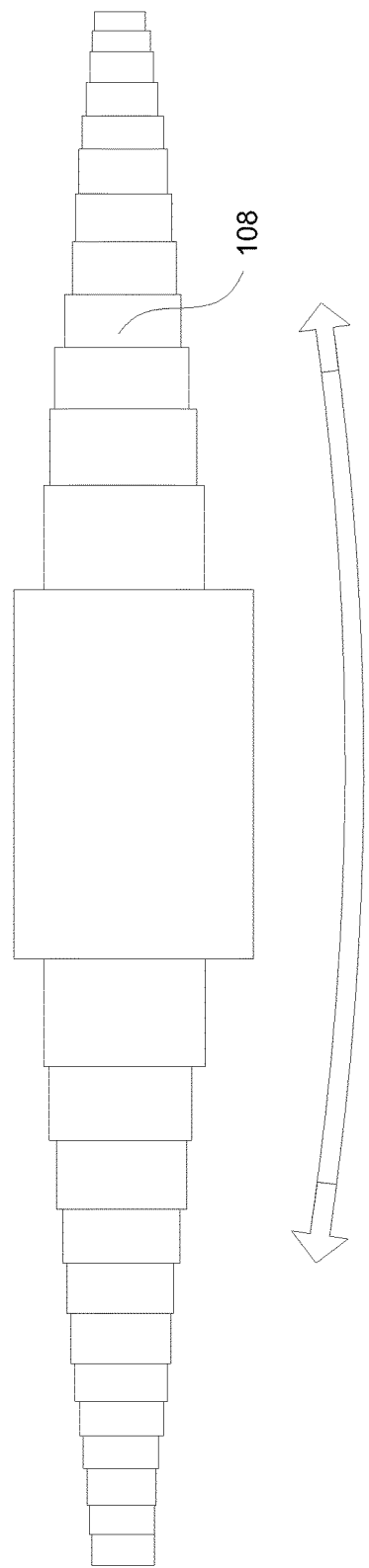
FIG. 5b illustrates the looped 'deck of cards' with no tags of FIG. 1D. This is shown alongside FIG. 5a for comparison.
Figure 6:
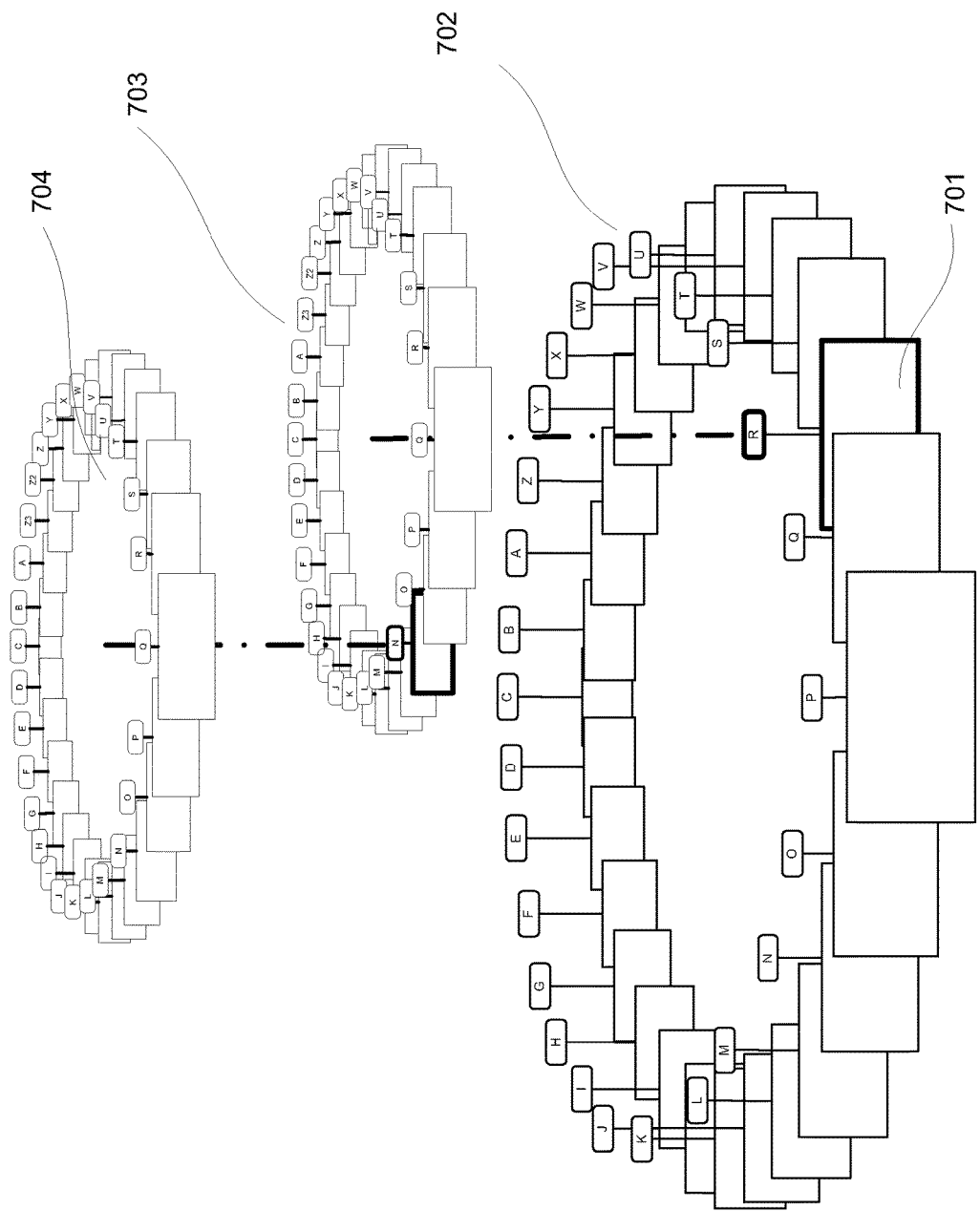
FIG. 6 illustrates a 'Parent-Child' embodiment in which the 'Parent' Tagged icon Carousel 702 has spawned a 'child' Tagged icon Carousel 703 from node icon 'R' 701 which in turn has spawned 'child' tagged icon carousel 704 from node/icon 'N'.

Some other possible embodiments of the invention include but are not limited to tagged icon carousels, looped or non looped tagged 2D and 3D linear image arrays of icons such as a Tagged 'Deck of Cards' variety and many more dynamic or static icon presentations some of which can be seen in FIG. 5, FIG. 1d and FIG. 6. The embodiment in FIG. 6 is a multi level, 'Parent and Child' tagged icon carousel in which user selection of a single icon at one level of the tagged icon carousel invokes a secondary 'Child' tagged icon carousel which produces another level of related data elements or navigation possibilities to the user. Further levels of 'Child' Tagged icon carousels can be generated.

Icons and/or tags displayed may incorporate motion in their behaviour under user or system control. Such motion may include but not be limited to elliptical, or linear, looped or non-looped or any combination of such motions which enable icons and tags to be placed on screen in the most appropriate manner for the application.

Figure 4:
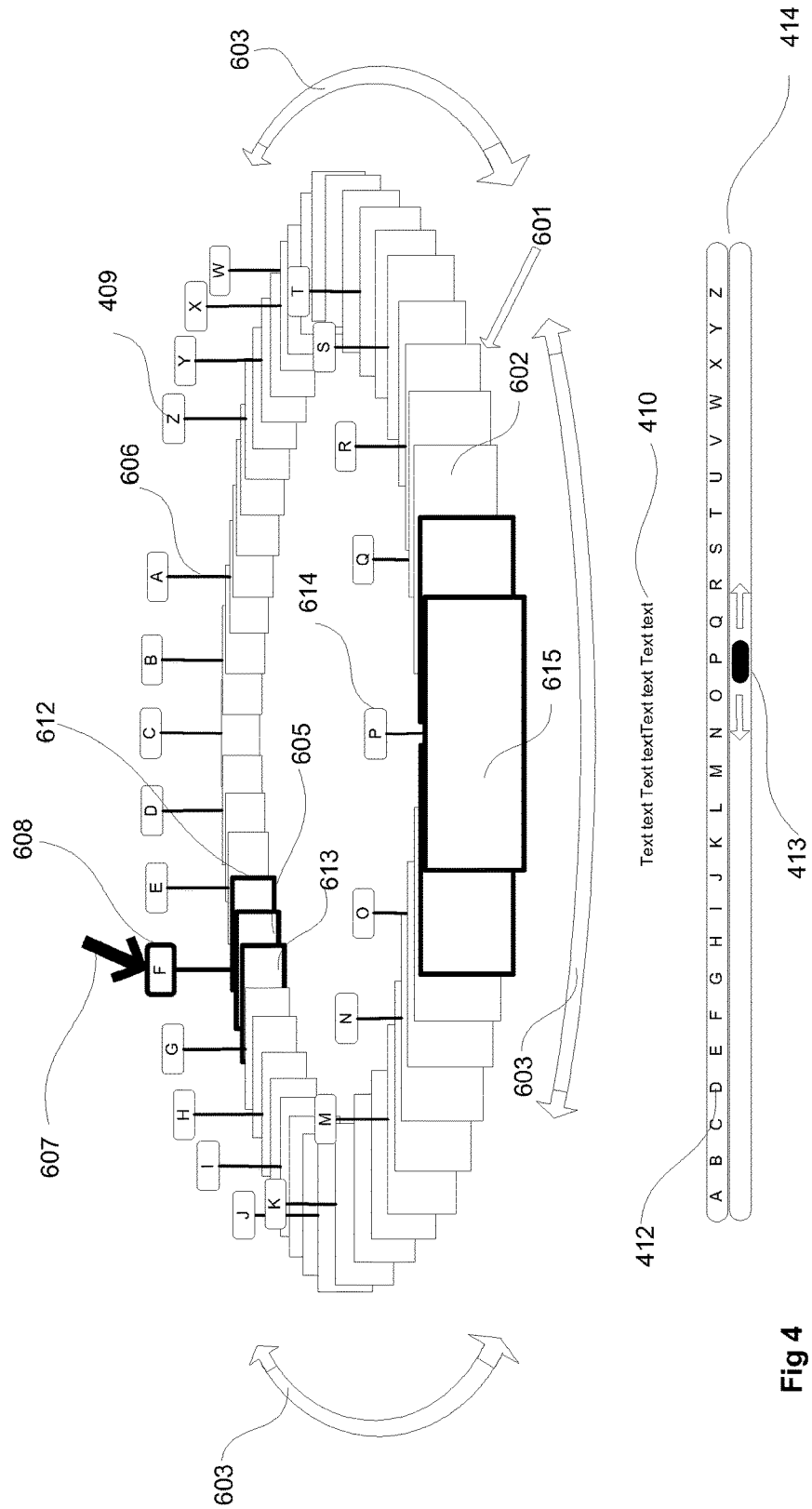
FIG. 4 illustrates the preferred embodiment with an instance of a single highlighted tag 608, being linked to more than one icon 605, 612, 613. The highlighting instance as in this case may be initiated by a users cursor 607 'mousing' over the tag or icons. Some tags are missing ('I', 'U' and 'V') because the data element set represented by the visualised icons contains no elements associated with those alphabetic characters. The rotation of the Tagged icon Carousel is illustrated by arrows 603. Icon 615 is the 'frontmost' icon or the icon visually 'closest' to the user. A dynamic annotated slider control is shown at 414 with slider 413, and dynamic characters or symbols 412 mirroring the tag character sequence in the tagged icon carousel display.

Examples to illustrate the use of some embodiments of the invention: FIG. 2a shows a single Tag 201 with character 'P' 202 associated with icon 203. This might indicate for example that icon 203 represents a data element whose name begins with 'P' (The composer Pagganini for instance)— FIG. 2e shows an icon with Tag indicating attribute 'T' and also the colour red. This might indicate a process state 'T' and a particular level of 'alert' status indicated by the colour red for instance. The users attention having been alerted by the 'Red' Tag and seeing state 'T' may go on to select the icon for closer inspection—The icon may then reveal other important system state parameters associated with system state 'T' and alert status 'Red' or the icon could be a video player window showing video images of a process that is a cause for concern. Alternatively, Character 'T' may be a video security camera location with the Tag colour Red indicating an alert for that location. The user can then select that camera's icon for closer inspection. FIG. 4 shows the preferred embodiment which could be suitable for this type of application. Another example of the use of some embodiments of the invention has for example, a set of icons (representing data elements) resulting from a user operation such as a filtering or sorting operation on a set of data elements or a system or user initiated change of state, which is to be displayed to a user. In conventional display systems, with no clue as to the location of contextual or hierarchical boundaries, it is extremely difficult for the user to know where to look to find relevant icons. For example, the user might wish to find icons related to a particular name or title—without a visual indication of the ordering and contextual boundaries within the whole icon assembly, the users search can be little more than random. Some embodiments of the invention, by using dynamic tags indicating contextual and hierarchical boundaries enable the user to locate at a glance, the icons of relevance to his or her search or task. Indeed the icons to be displayed may possess more than one attribute (properties, relationships and/or information) whose display to the user in a visually differentiated and ordered manner enable the user to focus on and make rapid choices based on the visual cues supplied by the tags displayed. For example, in the display of an online musical DVD catalogue, a search for Mozart's works could be displayed as icons ordered by opus number displayed numerically on the tags with 'popularity' as a second property displayed by the colour of the tags. Thus, immediately, a user who wanted to view a specific work or opus number could locate the group of icons representing all versions of that specific opus number. Whereas, a user who was more interested in selecting works by popularity could be guided by Tag colour to find the most popular works equally quickly. Having selected a particular work and its available versions by clicking on its tag, further 'Tags' could indicate popularity of those multiple versions. A third property 'Ensemble' (the musical instrumentation in the performance) may be revealed to the user by the inclusion of other symbols or properties in the tags.

Possible uses for some embodiments of the invention:
On screen User search interface
EPG (electronic program guides—TV/Radio schedules)
Industrial & medical process monitoring and control
Computer games
Media players such as pub jukeboxes
Displaying personal or business contacts
Result of an internet search. (Google, Ask, etc)
display of retail items at a sales terminal
display of users computer when internet shopping
Online auction results
Navigation device for any digital data display such as a computer, workstation, terminal.

The embodiments of the invention described may be displayed on a computer screen, a mobile phone, a personal multimedia device.

DESCRIPTION OF A PREFERRED EMBODIMENT

A preferred embodiment of the invention will be described with reference to the attached drawings.

Those skilled in the art will appreciate that some embodiments of the invention including the particular embodiment about to be described are not computer code specific and should be capable of implementation by anyone competent in the software arts in any reasonably comprehensive graphically oriented language or combination of coding systems such as HTML, Java, Flash C++ etc running on any suitable host digital electronic, microprocessor or computer based hardware or any general purpose or application specific computer or digital electronic system equipped with or able to interact with or connect to a display device that actively or dynamically presents digital data visually to a user and with which the user may interact. These include digital electronic systems such as but not limited to Internet enabled television display systems, Set top box systems, electronic program guides, multimedia presentation systems such as Juke boxes and hand held electronic devices including mobile phones and personal video players. In addition some embodiments of the invention may operate over a wired or wireless network or link such as the internet where it can form part of an advanced website. Some embodiments of the invention and in particular this embodiment are capable of being displayed on any visual display unit with sufficient resolution or pixel density. In more advanced implementations of the embodiment a 3D 'stereoscopic' or holographic display may be used to enhance the users appreciation of the depth or 'Z' axis of the displayed information.

User interaction with a working embodiment of the invention can be by any suitable means known now or in the future including but not limited to any wired or wireless pointing devices such as a computer mouse, keyboards, hand held remote device, touch screen, haptic or gesture based device or any other device existing or yet to be devised that permits a user to control or change the state of the system. All such devices unless specifically mentioned will be referred to as 'user interaction devices'.

In this preferred embodiment of the invention a user is presented with a 'virtual' 3D visualisation of many on screen representations of data elements for searching, sorting, browsing or navigating. The embodiment consists of a primary subsystem comprising a plurality of screen objects hierarchically or sequentially organised into two associated groups known in this document as icons and tags which form an integrated 3d, dynamic, rotatable carousel arrangement which for the sake of brevity will be called a 'Tagged icon Carousel'. The Tagged icon Carousel and its two most recognisable components are schematically represented in FIG. 4: Icons such as 602, 612, 615 (an icon is a graphical representation of a Data Element) and the associated Tags such as 614 are seen forming the rotatable 3d circular carousel arrangement 601.

Each icon 602 is a graphical representation of a data element or digital object stored within the system memory and presented on the users screen in a predetermined ordered way and with which the user may interact to perform various operations or actions. Practitioners of the user interface arts will recognise that said icons in this preferred embodiment or another embodiment of the invention, can be used to represent almost any kind of data element, navigation element or system control function. The elements represented by the icons are limited only by the actual requirements of the application and the imagination and skill of the system designers. Such uses include but are not limited to individual or grouped combinations of:

Directories, files, folders
Nodes
Properties
Categories
Chapters and indexing in books and other documents
URL's or links particularly for web sites
Moving or still images, photographs or audio items (or text or symbols representing such items)
Thumbnail images
Stylised representations of digital objects, functions or elements
Text or symbolic digital objects
Retail, library and catalogue items
Navigation or other active web site or application functions
Application 'Windows'
EPG elements (electronic program guides for online IPTV, TV, Radio schedules)
Complex industrial & medical process monitoring and control elements
Computer games
Multimedia: video, audio and still images
Personal contact data on mobile phones and other devices
any individual data element that a user may need to view or interact with on a screen
Haptic (touch feedback) systems for use by visually impaired people.

Each tag and icon in this or another embodiment of the invention may have a border or frame of shape, size and other visual properties suitable and specific to any particular application. Some possible examples for tags and icons are shown in FIGS. 2a-2i. Those shown should not be considered as an exhaustive list. Each tag used in any particular application will contain characters or symbols appropriate to the specific application as interpreted by the designers aims and will generally have a visible link to those associated icons it references. Colour, font, shape, size, texture, pattern, plurality and position or any other visual property of the tags may also be used to provide an engaging and intuitive means to indicate contextual relationships or aspects of relationships inherent but not necessarily otherwise apparent between adjacent or non adjacent individual or grouped icons. Culture and language of the intended users may also influence character choice, visual characteristics and contextual ordering in the displayed properties of the embodiment.

Each icon in this embodiment has a border, frame or window which can indicate to a user by any visual, or additional audible or other sensory means including change of colour, shape or other property including highlighting that it is active, selected or has become selectable or in some other way has changed state or may change state or initiate some other system action particularly in response to a user interaction. For example, this might be to indicate that an icon has been 'moused' over. This temporary change of state may be indicated to the user by the icon border changing colour or the icon itself changing visually in some other way. In FIG. 4 a users cursor is 'mousing over' tag 608 and in response icons 613, 612, 605 have changed visual state as indicated by the darker frame to the icons indicating their association with tag 608.

The entire group of displayed icons represent a set of hierarchically related and ordered data elements which are necessarily to be displayed on the users screen. Data elements will be arranged sequentially or hierarchically according to a predetermined or user selected property common to all data elements in the set to be displayed. For example, this might be a numeric property such as 'shoe size' if the display is related to a retail catalogue of shoes or an alphabetic property such as the first alphabetic letter of the name of each data element if the user is to choose icons by name.

In some embodiments of the invention including this preferred embodiment, a key inventive step has been made whereby annotated 'Tags' form a dynamic visual indexing system whose purpose is to indicate to the user the positions within the display and contextual relationships between adjacent or non adjacent individual icons such as 602 in FIG. 4 (associated with a tag featuring alphabetic character 'Q' in that diagram) or an icon group 605, 612, 613 (all associated with tag featuring character 'F'). Each contextually distinct and sequentially or hierarchically ordered icon or icon group in the 'Tagged icon Carousel' display is visually associated or linked with a dynamically ordered or sequenced identifier, flag or label referred to in this document as a 'tag' 608.

The Tags described in this application and forming part of the preferred embodiment are not to be considered as mere labels, description or 'titles' for icons they are linked to: Their purpose is much more complex and deep than that: At their core they form a dynamic, rapid visual indexing system possessing very simple and powerful visual cues enabling users to make rapid context based visual inferences about the hierarchical or sequential ordering, location and attributes of adjacent or non-adjacent individual and/or grouped icons in the display. It should be noted that in prior art referred to elsewhere in this document, with more than just a handful of icons it would be extremely difficult or even impossible for the user to read or visually recognise names, ordering and contextual boundaries inherent in the display if titles or descriptions of icons were displayed. There would simply be too many and they would almost always be overlaying one another. In some other examples of prior art, names or descriptions may be displayed one at a time which means that for any more than a few icons it takes a very long time to read each one and memorise it and its position.

The Tags described in the application comprise one or more characters, symbols or other distinguishing and ordering means, including but not limited to, alphabetic or numeric characters of any known or yet to be devised language, symbols, patterns or whatever graphical hierarchical system is appropriate for the geographical language used and the application which the preferred embodiment is being used for. Tags may also use colours, size, visual textures or any visual device the system designer deems appropriate to indicate and differentiate contextual boundaries or hierarchical or sequential grouping amongst the icons on the screen. Combinations of any of these visual means can be used to indicate more than one contextual hierarchy or structure within the icons displayed on a screen. FIGS. 2a-2i show just some of the possible arrangements of Tags and icons together with their labelling which may feature in this preferred or another embodiment. It is a preferred feature of the Tags that they are arranged as a visually recognisable series or hierarchical ordered array and which by their visual association or linking with the icons in the display permit the user to see the structure and hierarchical ordering of the icons in the display together with the contextual boundaries between different groups of icons in that display.

Each tag 305 (FIG. 3a) may be visually associated with and linked to one or more adjacent icons, for example 302, 303, 304 in the display, in a 'one to many' relationship and will in this way reveal categories, nodes, subsets or other contextual groupings within the icons and the boundaries between them. Each icon 303 (FIG. 3a) may also be associated with more than one tag 305, 308 in a 'many to one' relationship (many tags to one icon)—for example an icon may represent a collection or compilation of music tracks by more than one composer whose names would be represented by said tags.

Figure 8:
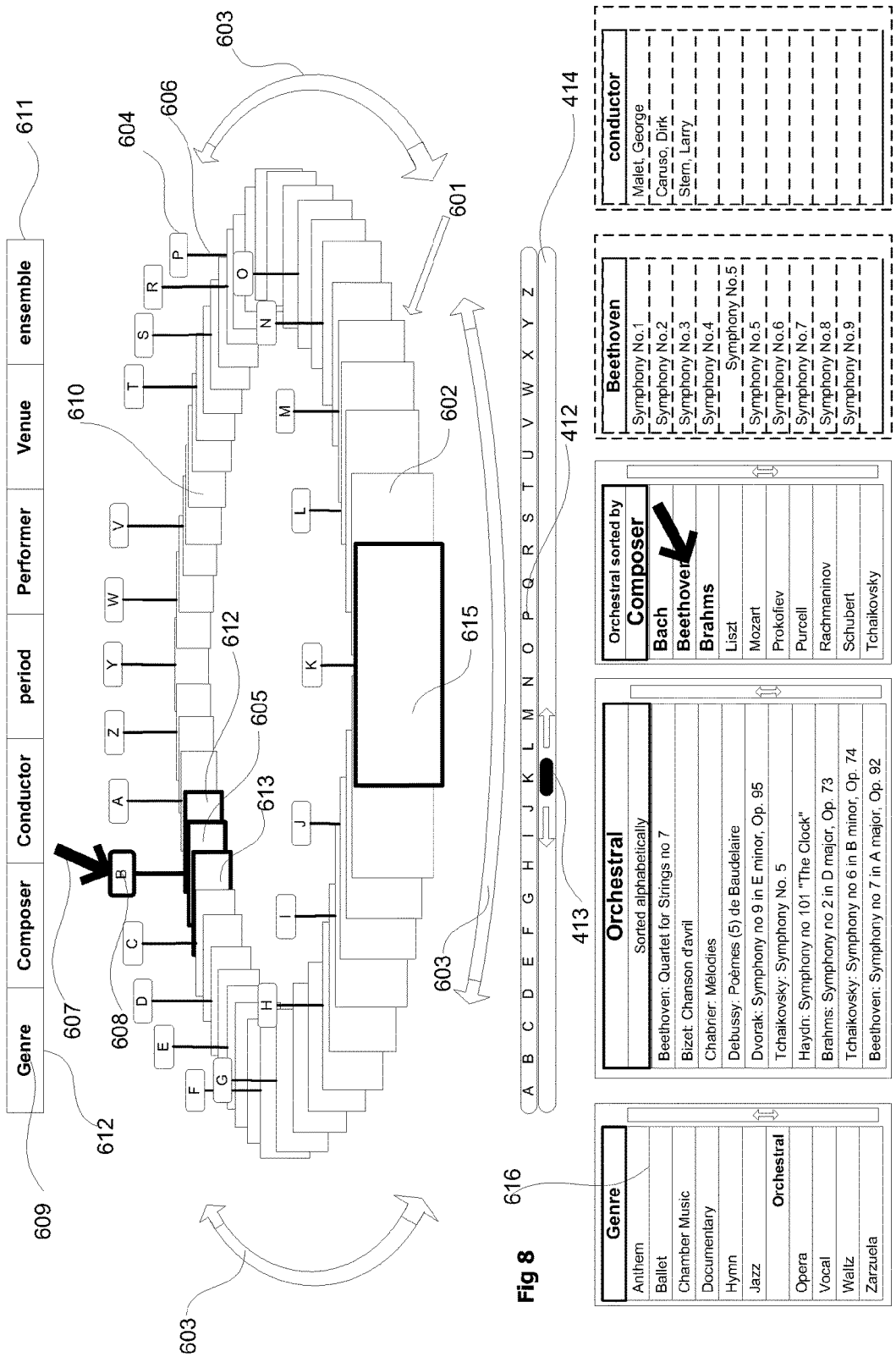
FIG. 8 illustrates a 'tagged icon carousel' 601 embodiment of the invention with a plurality of integrated multiple lists (Jukeboxes) 616 and illustrative possible user search 'buttons' 611. Also shown is a dynamic annotated slider control 414.

A further key feature of some embodiments of the invention is an optional annotated scroll bar in which the same ordered symbols, characters or other visual devices 412 (FIG. 8) that appear in the tags displayed in the Tagged icon Carousel are shown presented in a linear display 411 (FIG. 8) together with a slider or scroller control 413 (FIG. 8). The optional scroll bar may also be used to display some other property associated with the displayed icons. For example the annotated scroller may display channel numbers for a television service whilst the Tags in the tagged carousel may display programme times. The annotation on the scroll bar is optional in the sense that it may be left out of any particular embodiment of the invention without significantly impairing the functionality of the device. However, for some users it may be a more intuitive means of selecting tags and icons that give the user an important optional way to examine or browse icons in the Tagged icon Carousel very precisely. In operation, a user would interact with the scroller controller 413 using a mouse or other user interactive device or method to 'Drag' or move the scroller control button so that it was immediately adjacent to whichever character or symbol was appropriate to their search or navigation task. Such interaction with the scroller control causes the tagged icon carousel to rotate to a position where the icons associated with that character are relocated at the front of the tagged icon carousel. This can be seen in FIG. 8 where the scroller control has been 'dragged' adjacent to the letter 'K'. This has caused the tagged icon carousel to rotate bringing the icons associated with the letter 'K' to the front position. When implementing the preferred embodiment for any particular application this control may be left to the user to be toggled on or off using a control not shown in the diagram for simplicity. Alternatively the system designers may choose to remove the annotation if the number of characters to be presented is too large for the space given in that particular application of the embodiment. It is possible for this control to be positioned in other orientations and locations such as vertically on the screen without compromising its functionality. Positioning the slider against a symbol or character in the scroll bar is functionally the same as selecting the tag of the same character.

In this preferred embodiment, the Tagged icon Carousel device consisting of icons, such as 615 (FIG. 8), tags such as 614, and any additional controls such as the slider system 414, are drawn on the users screen by the graphic display subsystem of the host equipment as a representation of objects moving in a virtual 3D space with icon and tag dimensions and motion scaled to represent their apparent depth in the 'Z' axis perpendicular to the screen surface. (The screen can be considered to be a 2D X-Y space) This helps to create the illusion for the user that the objects comprising the Tagged icon Carousel are 'floating' in a 3D space. In a more advanced implementation of the embodiment the visual display may use 'Stereoscopic' or holographic means to give the user a much more realistic visual perception of 'depth' in the 'Z' axis.

The Tagged icon Carousel may dynamically rotate around an axis under system or user control in order to permit a user to examine individual icons or icon groups. Normally but not necessarily such rotation would bring an icon or icon group of user interest to a predetermined frontal position for further inspection or functional use. In FIG. 4, icon 615 and tag 614 are located at the frontal position where they are at the largest scale size on the users screen enabling closer and more detailed user examination Tags will rotate or move within the display visualisation so that they continue to maintain the visual association or linkage to the icons or icon groups they were associated with or linked to. Tag position, scale and font size are set by the system designer to provide good legibility in any position on the users screen. Tag size and motion may be scaled to more closely represent normal perspective and 'Z' axis depth effects.

The association between a Tag and its associated or linked icons can be indicated to a user by highlighting or other obvious visual change of state of the Tags and icons involved which clearly identifies such associated tags and icons from the others around it. Such visual change of state may be triggered by a suitable user interaction such as moving the user's cursor over a tag or icon (A behaviour known as 'Mousing over'). In the preferred embodiment all icons associated with a moused over Tag show the highlight or change of state. Such highlighting enables a user to recognise the group of icons that are contextually associated with the moused over tag and then initiate further selection, searching, navigation or system control actions. Equally, a moused over icon may highlight its associated tag or tags in the same way.

When a user has located an icon or group of icons of interest, he or she may initiate a further interaction by using a mouse or other user interaction device to select or click the tag or icon. Icons & tags in the embodiment are dynamic in the sense that they can rotate around a virtual axis on the screen in response to user input and the state of the system and are active in the sense that selecting or interacting with an icon or tag may initiate some sort of predetermined action or system change of state. Curved arrows 603 (FIG. 4) represent possible rotational directions of motion of icons and tags in the preferred embodiment. In some other embodiments or applications the motion of tags and icons may be different. For example in the preferred embodiment one of the possible methods amongst many by which such user interaction would initiate a rotation of the tagged icon carousel is as follows: In FIG. 4 a user's cursor is seen 'mousing' over a tag 608. If that tag or an associated icon is then selected (clicked) with the user's interaction device, the Tagged icon carousel would rotate bringing the selected icon or icons to the front position 615 where it can be inspected in more detail by the user. At this point further options may be presented to the user depending on the embodiment's current state and the application it is being used for.

In addition to rotating the carousel by selecting icons or tags, rotation may also be initiated by moving the scroll button 413 to the left or right using a click and drag mouse action or any other desired user interaction method (described elsewhere in this document). Any other combination of key input or user interaction device input can be arranged to initiate such movements or state changes in the present embodiment. The user is thus able to precisely control and rotate the 'Tagged icon Carousel' in order to bring any particular individual or group of icons to the front of the display—In this case tag 'P' and its associated icons are at the front position and so is the slider 411. In this way, the positioning of the slider on the scroll bar can be seen to be equivalent to rotating the Tagged icon Carousel using the tags or icons. Other user input devices including the controls of the Jukebox lists and word assemblies to be described later in this document can also have equivalent functionality.

It is intended that the system software controlling the 'drawing' of screen display elements will arrange for as many tags as possible to be visible to the user at all times. As indicated in FIG. 4, the rules locating tags on the screen will ensure that the elevation and clearance from one tag to another allows no significant overlap.

Figure 9A:
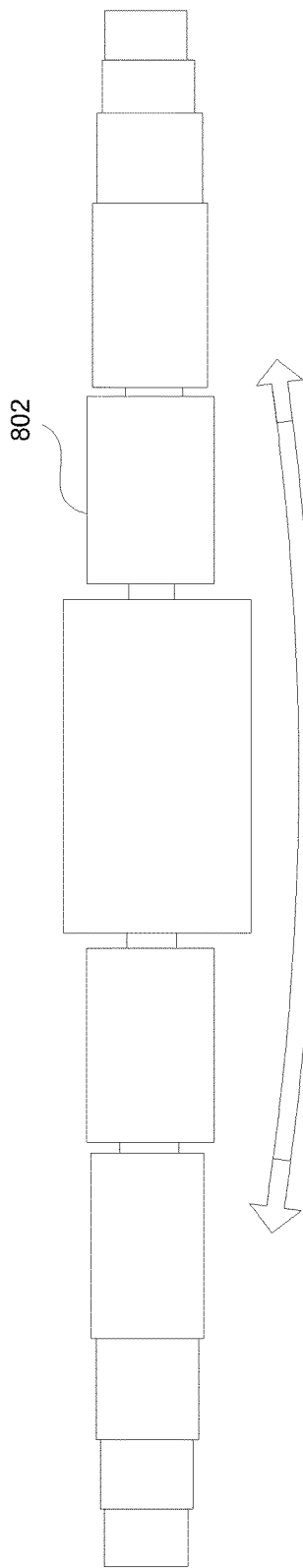
FIG. 9a illustrates a non-Tagged icon carousel seen edge on in which only the front icons are seen.
Figure 9B:
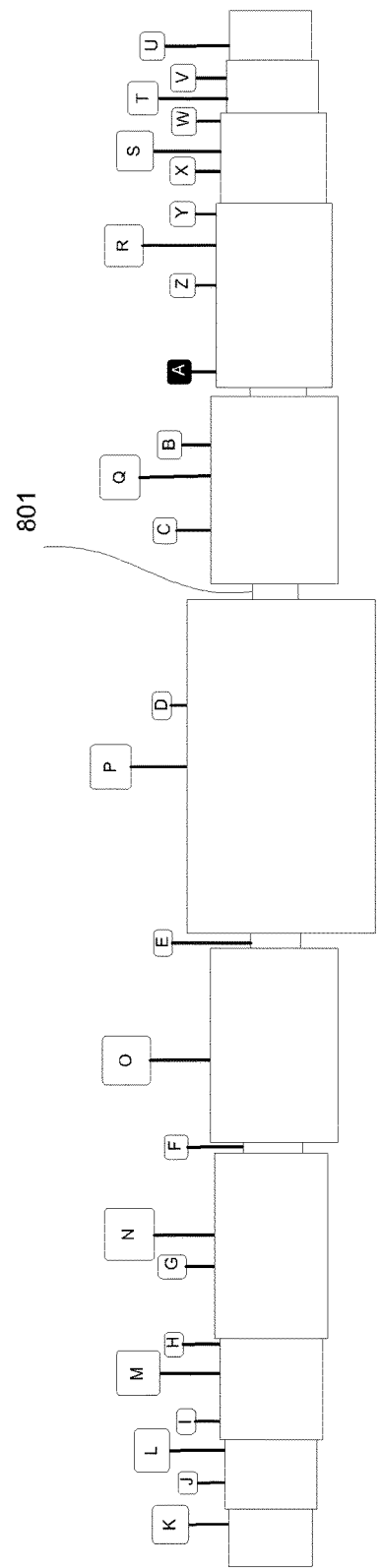
FIG. 9b illustrates a Tagged icon carousel seen edge on in which the unseen icons can clearly be located and interacted with using either the tags or the annotated scroller bar.
Figure 9B:
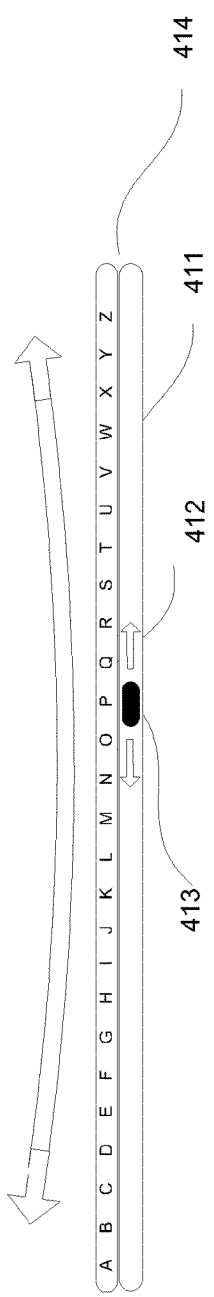

Ideally, the 'apparent' angular elevation of the user's viewpoint which may be preset by the embodiment's designers, is set so that the top edge of the foreground icon does not obscure the bottom edge of the rearmost background icon and also makes allowance for the gap between foreground and rear icons to be large enough to accommodate the tags for the foreground icons as in FIG. 4. In some applications of the preferred embodiment the apparent angular elevation may be reduced or minimised in order to reduce the onscreen height required for the display. With prior art carousels and similar devices when seen with a small angular elevation for the users viewpoint as shown in FIG. 9a i.e. close to 'edge on' to the carousel, it is impossible to see or locate icons that are hidden by the icons at the 'Front' of the device—In FIG. 9b showing a user's 'Edge on' view of the preferred embodiment it, can be seen that the 'Tags' or the scroll bar in the preferred embodiment, being a key part of some embodiments of the invention, continue to enable a user to locate, access and interact with the obscured or hidden 'rear' icons. When the embodiment is in this 'edge on' orientation for a user it will be referred to in this document as the 'Contracted' Tagged icon Carousel.

In this preferred embodiment the choice of characters or symbols and other indicators that comprise a series of tags will be pre-defined by the system designers based on the exact nature of the application that the preferred embodiment is being used for. In use the annotations for the tags, scroll bar and Jukebox lists will be selected and preloaded at run time by the system logic with reference to the context of the users query or task in the application that the embodiment is being used for. Often a simple alphabetic or numeric tag sequence will be all that is required to guide the user.

A further key component of some embodiments of the invention is the addition to the tagged icon carousel visualisation, when required by the user or the system, of a subsystem comprising a plurality of ordered dynamic text based lists or word assemblies. Each list or word assembly represents the contents of the Tagged icon Carousel at a different state of the system or user's search or other activity. Such static or dynamic text based lists have become known to those engaged & familiar in the art as 'juke boxes'. However, such text based lists or word assemblies when dynamically linked and integrated with the Tagged icon Carousel in the manner set out herewith, the functionality and accessibility of visual representations of data elements is vastly improved over any previously known embodiment of such prior art device.

The primary function of the 'jukebox' lists in some embodiments of the invention is to present a sequentially ordered text or character based array which represents, complements &/or mirrors the Tagged icon Carousel's current and previous user or system generated states thus permitting the user to visualise and revisit any part of the current or previous states or nodes in the current node tree, search path or navigation path. FIG. 8 shows such a series of concatenated lists. List 616 is an example. Each adjacent list being a separate previous or current stage or node in the user's navigation or search task with the right most list being the current node representing the current contents of the tagged icon carousel. In FIG. 8 the central list headed 'Orchestral sorted by Composer' is the current list (the two dashed lists to the right indicate possible future lists). To the left of the current list is the previous state and further to the left are the Tagged icon carousel states prior to that. Hence the Jukebox can display all possible divergence nodes from that entire user search or navigation path because each list displays all the possible data elements presented in each previous level of search or navigation. Thus each icon in the Tagged icon Carousel or tagged icon device is mirrored by a corresponding text 'item' in the 'current' list in the jukebox. In FIG. 8 a user's cursor is seen 'Mousing over' the text item 'Beethoven' in the list. The other names associated with the letter 'B' are also highlighted in the list. The tagged icon carousel above to which this Jukebox is integrated shows icons 605, 612, 613 one of which must be an icon representing the data element 'Beethoven'. The associated tag 'B' is also highlighted. In this way the Jukebox represents a complete node tree for the user's current usage of the device. A user may therefore go back to any previous stage of his or her navigation or search activity or task and initiate a search from a different node within the search tree. This facility may be optionally further extended by allowing the system to record such jukebox states and searches for future recall and use.

Figure 11:
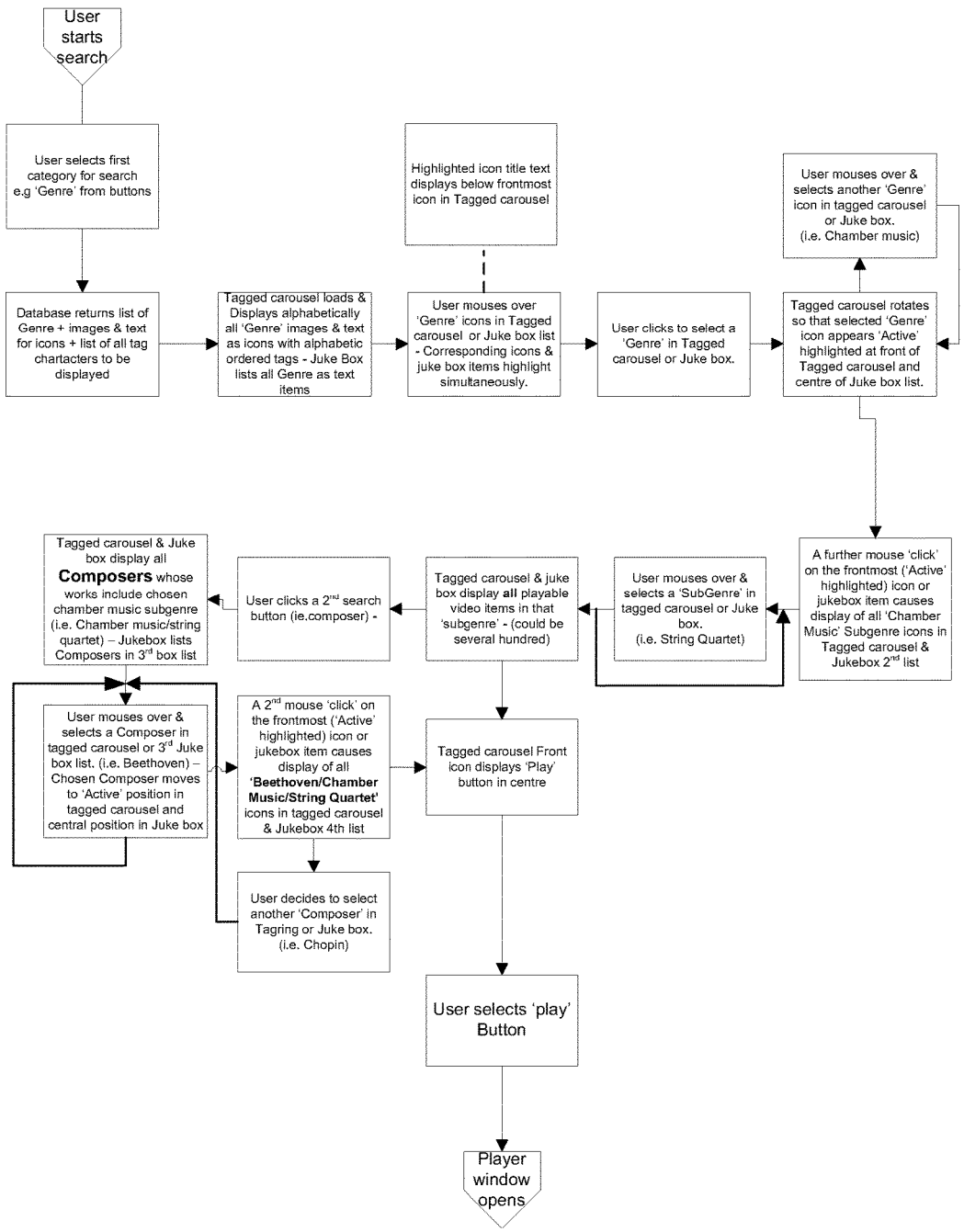
FIG. 11 is a possible flow diagram of a user search using the preferred embodiment, the tagged icon carousel, in a video on demand website search interface and described below.
Figure 12:
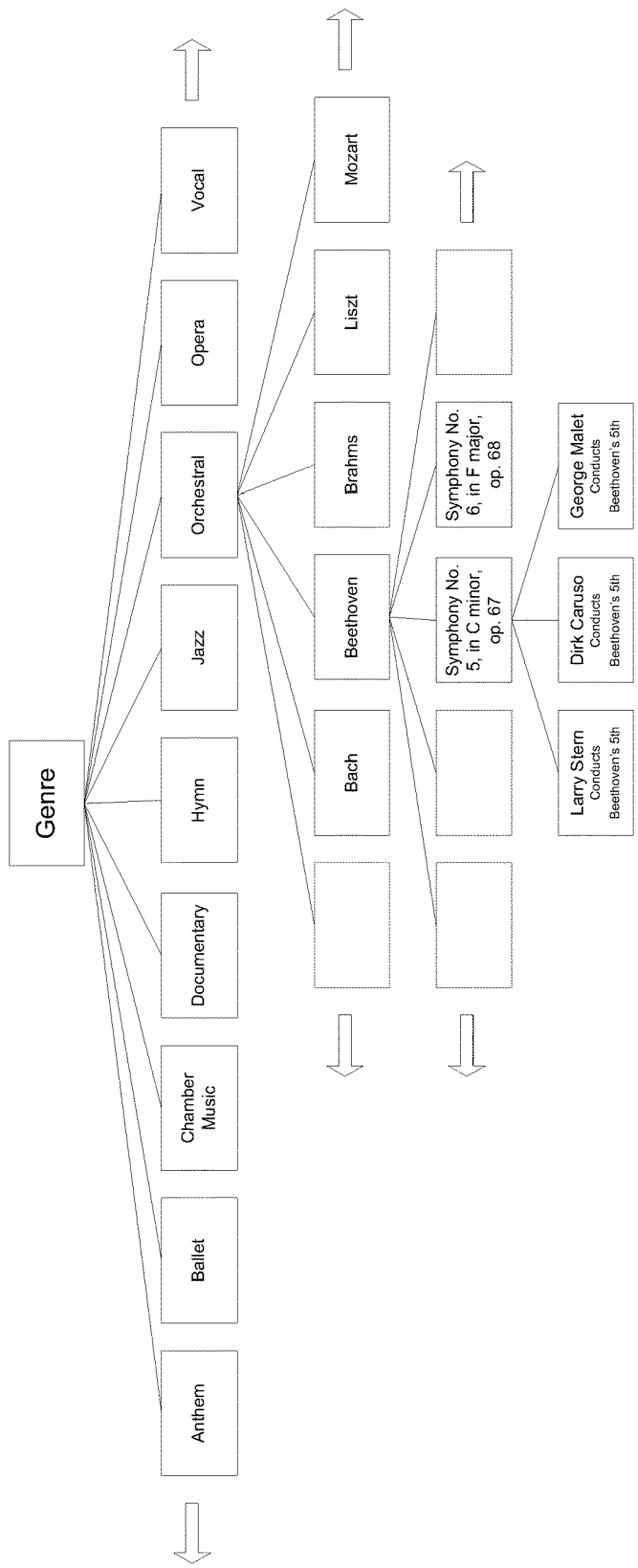
FIG. 12 is a data node tree for the data elements encountered in the users search in the example of a video on demand website search interface described in the preferred embodiment.

In order to demonstrate the preferred embodiment's utility, we will describe a particular application of the preferred embodiment using the Tagged icon Carousel with its integrated and associated 'Jukebox' lists. A flow diagram for this process is shown in FIG. 11. Together, the two subsystems, the Tagged icon Carousel with its integrated and associated 'Jukebox' lists, function as a highly intuitive and engaging integrated user search interface on a music based 'video on demand' (VOD) website, enabling a user to rapidly select musical items of content to be played. In this kind of application each item of content will have been categorised within the database by specific terms including many types of 'Genre', 'Composer', Performer', 'Instrumentation' and 'Venue' etc. FIG. 8 shows such an application of preferred embodiment in which a row of buttons 611 provide the primary search input terms. The use of such preset terms serves two purposes: It limits a users choices of search terms to only those that have any relevance to the database items and secondly prevents any problems due to misspelling and 'typos'.

In this application the sequence of search terms selected by the user is used to generate a concatenated sequence of queries on the host system database which then returns a result consisting of those data elements fitting the search criteria. These will be displayed as icons in the Tagged icon carousel and matching text terms in the current Jukebox list. The results are displayed and ordered according to the preset logic set by the designers via the host system's graphic/Flash engine which generates the onscreen objects and their motion. In this application of the preferred embodiment a mouse is used for functional user interaction such as mousing over, clicking and selecting tags and icons or initiating Rotation of the tagged icon carousel. Any other form of user input device or method suitable for the application, and outlined elsewhere in this document may be used.

To initiate a search of the classical music catalogue the user first clicks & selects one of the category buttons 611 in FIG. 8. A corresponding query string is generated by the application software and sent to the system database as shown in the flow diagram. This query string might be of the form "search.php?q=genre=chamber_music&subgenre= duo&composer=Mozart This would correspond to a search for the genre of 'Chamber Music and Mozart's music—For example we will assume that the user has selected 'Genre' for the initial search term. The system responds by returning a number of data elements which represent all 'Genre' types in the database. Each Genre is displayed as an icon (static graphic image) in the Tagged icon carousel on the users screen and as an associated text item in a first Jukebox list 616. The icons and text items are sorted or ordered by the application logic into an alphabetic sequence with each group of icons marked or associated by a tag displaying the appropriate alphabetic character. In this scenario, there may be twenty or thirty or more icons displayed in the tagged icon carousel, many of which would be obscured by those appearing in front of them. This is where the utility of the 'tags' allows the user to locate at a glance, exactly where in the tagged icon carousel, icons of interest are—in a non-tagged icon carousel such as those mentioned in the prior art above, it would be almost impossible, without examining each icon in turn, to locate icons specific to the users enquiry. In fact carousels and similar 'devices' are hardly ever used with more than 10 icons present because it is extremely difficult or impossible to visually identify individual icons due to the fact that most of them are obscured by others overlaying them. However, in some embodiments of the invention, the presence of the alphabetic tags associated with each of the groups of alphabetically arranged icons in the tagged icon carousel, allows the user to pinpoint at a glance the location of any of these groups of icons in the Tagged icon carousel and the boundaries between them.

Let's assume the user wishes to look for the specific genre of Orchestral music. Having displayed all genres of music alphabetically, the user immediately selects the 'O' tag which causes the Tagged icon carousel to rotate bringing all the icons associated with the letter 'O' (i.e. titles beginning with 'O') to the front position 615 of the tagged icon carousel. If it is not immediately apparent which icon, now at the frontal position represents 'Orchestral', a few clicks to rotate the tagged icon carousel one way or the other will reveal the icon required. Alternatively, the Tagged icon carousel may be rotated by user interaction with the annotated scroller bar which can be used to rotate the Tagged icon carousel in discrete single icon steps or return any particular alphabetic group to the frontal position as if a Tag had been selected. In this way the Tags and the annotations on the scroller bar can be seen to be equivalent and yet complement each other. As such rotation takes place, the first 'Jukebox' list moves up or down, mirroring the rotation of the tagged icon carousel. The items beginning with 'O' are moved to the middle of the first jukebox list and the corresponding icons in the carousel are rotated to the front of the carousel. The user can now see 'Orchestral' near the front of the Tagged icon carousel or near the middle of the Jukebox list from either of which the user now selects 'Orchestral'. This initiates a new query to the database which returns icons and text items to repopulate the Tagged icon carousel and a new Jukebox list. These are all the 'Orchestral' music items contained in the database. This new, second Jukebox list is generated to the right of the first list. The second jukebox list contains the same Orchestral items as text which now appear in the updated Tagged icon carousel as icons.

The user can use the same workflow to refine the search further by selecting another category button such as 'Composer'. This action would cause the Tagged icon carousel to display images of all the composers in the database whose works were 'Orchestral'. A third Jukebox list is generated to the right of the previous one and now displays as text, the names of the Composers who's works are in the orchestral group. This list is headed 'Orchestral sorted by Composer' shown in FIG. 8. The user can decide to look through the third Jukebox list to find the composer of interest or use the tags on the tagged icon carousel to quickly find the Composer appropriate to his or her search. Each is equivalent to the other. Let us further assume that 'Beethoven' is the user's desired composer of orchestral works on this occasion. Beethoven is easily located amongst the possible 100 or more composers displayed in the Tagged icon carousel simply by clicking the 'B' tag which rotates the tagged icon carousel to display the 'B' composers at the front of the carousel. This is seen in the middle list in FIG. 8. Had the user decided to select from the Jukebox list he could have scrolled through the latest list to find Beethoven's orchestral works.

The user could, using the same workflow, go on to refine the search further by using the Performer, Venue or Ensemble selection buttons in any order she or he wishes.

Using the 'Jukebox' lists, the user could return immediately to any previous node or level in his or her search and divert to a different search path. For example, the choice of 'Beethoven' could be changed at any point to 'Schubert' or any other composer simply by selecting it from the list of Composers in the appropriate list.

In other applications of the preferred embodiment such as the case of an online retail catalogue, more than one parameter may be revealed by the tags. The system designers might choose to display 'shoes' by size, numerically displayed and ordered on each tag and also by tag colour—Thus revealing which colours where available in which sizes. In another application such as a TV or Radio electronic programming guide, programs may be displayed by channel number numerically ordered or sequentially by time of broadcast. In all these cases the choice of tag characters and their ordering will be dictated by the nature of the particular application and the art, skill and culture of the designers.

Having selected an icon (data element) suitable to the user's purpose or task using the method outlined in this preferred embodiment or another embodiment of the invention, the user may then initiate a further action according to the requirements of the particular application in which the embodiment is embedded. This might include but not be limited to: play this video; order shoes of this size and colour; order this drug for patient; Call this contact; change system state to this value; navigate to this function or page etc. The purpose of each application and the artistry of its designers will dictate the actions that a user may follow having successfully used the embodiment.

Generally, the links between icons and tags are arranged to be such that tags are always visible and clearly linked to the icons with which they are associated even though the icons to which they are attached are frequently obscured by other icons in front of them. The links or lines between tags and icons may be visible or invisible depending on aesthetic considerations but the actual association may be revealed by some other means such as highlighting a tag is moused over or interacted with by a user interaction device. Tags will follow the icons to which they are associated or linked and in this way can be understood as a powerful dynamic visual indexing system. Users will be able to see at a glance how tags and their associated icons are contextually organised and will be able to locate and select at a glance, individual relevant icons or areas where icons of interest will be located within the whole display even though there may be a large percentage of icons with visual content partially or fully obscured by overlying icons.

Another facet of the preferred embodiment's behaviour is its ability to 'contract' into a minimised form. Unlike the minimised 'Windows' of many current operating systems and other applications which can be reduced to a small icon on the screen with a mouse click and which do not then retain any functionality other than the ability to be expanded again or 'turned off', the 'contracted' Tagged icon carousel can be significantly reduced in size on a user's screen but retains many useful navigational and search functions including the display of its current state and its continued responsiveness to user interaction. In the contracted form the Tagged icon carousel's utility is to free up screen area for the display of other content, media players or other applications not relying on the comprehensive search or navigational functionality of the full sized Tagged icon Carousel. FIG. 9b shows a tagged icon carousel in its contracted mode. This is simply the normal tagged icon carousel effectively seen from an 'Edge On' viewpoint. In this mode the tags may be turned off in order to recover the screen area they occupy. Also shown in the diagram is the scroller bar which can be used to supplement or replace the missing tags if screen area is an important concern to the designer in this mode. In contrast it can be seen from FIG. 9a that an edge on carousel without tags or annotated scroller bar, provides no clue to the user as to the location of icons not visible at the front.

Speed and direction of scrolling or rotation may be a function of and controlled by the position of the users cursor in relation to a particular scale (within the display) or origin (fixed point) or it may be a preset function set by the designers who implement an embodiment of the invention—The user may also be given some control by modifying user preferences within the application.

Figure 7A:
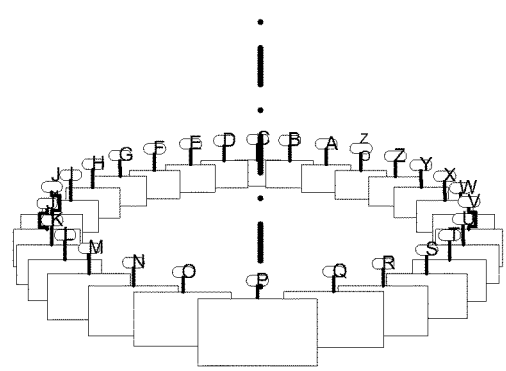
FIG. 7a illustrates a pair of tagged icons carousels which are co-axial.
Figure 7A:
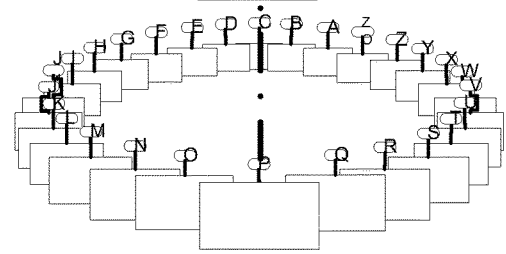
Figure 7B:
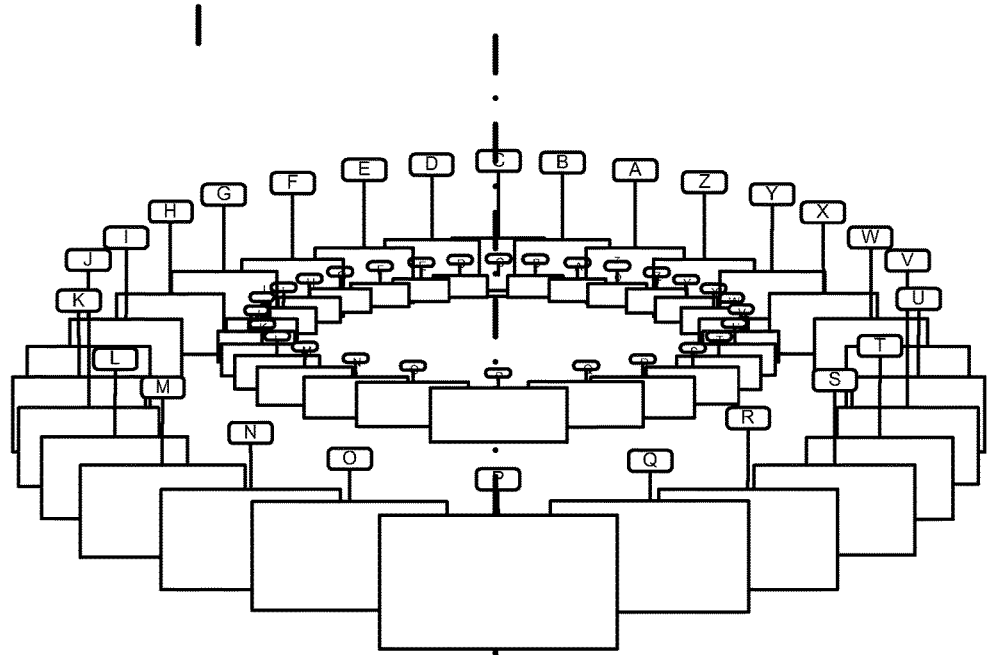
FIG. 7b illustrates a pair of concentric and co-axial tagged icon carousels. (More than two tagged icons carousels are permitted within the spirit and intent of the application)
Figure 10:
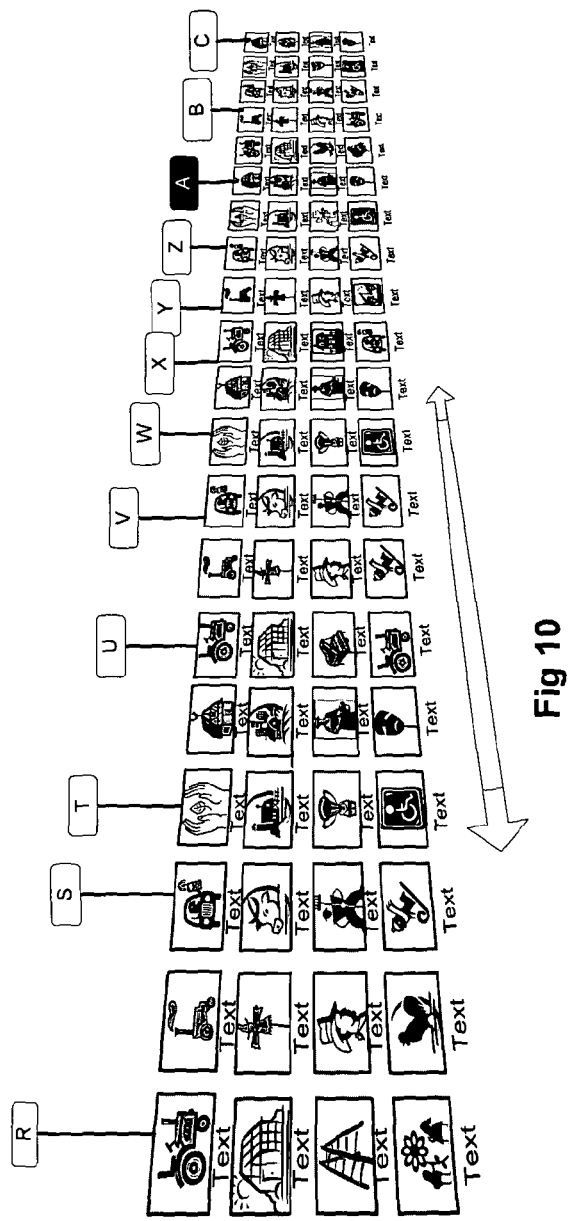
FIG. 10 illustrates a further embodiment featuring a linear grid or array of icons with associated tags.

Further embodiments of the invention include but are not limited to: A tagged icon device comprising a plurality of tagged icon carousels arranged in a 3D concatenated multiple level hierarchical sequence of said icon & tag systems, known as 'parent and child' arrangements. These permit users to select an icon in a particular carousel and generate from this a new 'child' carousel on a users screen as shown in FIG. 6—each new tagged icon device representing a further consecutive level of navigation, search or sort tree node; A tagged icon device comprising a linear array or grid of tagged icons shown in FIG. 10; Concentric or Co-axial tagged icon carousels as shown in FIG. 7a & FIG. 7b While some preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the inventions as described in the claims. In addition certain elements described may be omitted or made optional when not deemed appropriate for a particular application Those skilled in the art will appreciate that an embodiment of the invention can utilise any method in the prior art to generate the elements that comprise the embodiment.

The method of and data to be displayed in the annotated scroller device described above may be modified to provide an alternative representation to the user of the structured information presented in the tagged icon assembly or device. Alternatively the annotated scroller shown in FIG. 4 may graphically present a related or derived data set which enhances the user's search or activity experience.

The series of multiple text based lists and/or word assemblies (Jukebox)—will generally represent the hierarchical ordering of a users search path or possible system activity states. The actual ordering of the data elements listed in each list will be consequent on the particular embodiment.

Each new jukebox list may display a filtered or sorted subset of the previous list's data set.

In the same way that interacting with the tags in the tagged icon assembly will cause a system state change such as selection of icons & rotation of the device, interacting with the annotation of the annotated scroller device such as clicking and selecting a character may be enabled by the system designer to cause the same or a related action to occur. This will form an enhanced and useful alternative method for the user to interact with the tagged icon assembly.

Additional uses for the system include Chapters and indexing in online and offline presentation of ebooks and other complex documents.

The tagged icon assembly is understood to include the tagging of any animated ordered arrangement of icons or images to be presented to a user by the method described in this patent.

The data to be presented to a user may be derived internally to the host system or externally from a remote source or data repository or memory storage device via a network or other wired or wireless means.

The second subsystem forming a principle part of the preferred embodiment of the invention and described earlier in this document being a hierarchic, multiple, interactive, dynamic integrated text based list or word assembly system in which the users interaction or selection can form the filter or sort input to query the database concerned—the result of which is displayed in the tagged icon assembly described. Other forms of interactive text, character or symbolic assemblies and lists may be used in order to input such queries and actions including but not limited to 'drop down' lists, faceted search lists, tagclouds or other word assembly systems and are to be considered as included within the breadth of some embodiments of the invention.

The sorting, filtering and other actions that can be carried out by the second subsystem (Jukebox) may be supplemented by additional controls that enable the icons and their associated tags to be displayed according to different 'Sort' requirements. For instance, in the example given of a classical music searching system, the displayed works of a particular composer could be sorted according to opus number, alphabetically by title or conductor etc. Each choice would enable a change of tags to be displayed according to the users chosen criteria. These choices could be made available to the user using a simple drop down list or other simple method of displaying options to a user and forming part of some embodiments of the invention.

What is claimed is:

1. A user interface method comprising:
    causing a plurality of first objects to be displayed, the plurality of first objects arranged sequentially along a first looped path which is ordered according to a first predetermined or user selected property common to all of the plurality of first objects, the plurality of first objects being fully or partially displayed, wherein each first object is unique;
    causing at least two second objects to be displayed, the at least two second objects arranged sequentially along a second looped path, each second object corresponding to, and providing an indication of a value or a range of values of the first predetermined or user selected property, wherein each second object may also provide an indication of one or more additional predetermined or user selected properties, wherein the user interface comprises at least one hardware processor, and memory comprising a computer program, and wherein the at least one processor and the memory and the computer program are configured to cause the at least two second objects to be displayed by:
        in a case where a single first object has a value or range of values of the first predetermined or user selected property which corresponds to a single second object, causing said single second object to be associated with said single first object;
        in a case where a set of two or more first objects have a value or range of values of the first predetermined or user selected property which corresponds to a single second object, causing said single second object to be associated with each of said set of two or more first objects;
        in a case where a single first object has a value or range of values of the first predetermined or user selected property which corresponds to a set of two of more second objects, causing said single first object to be associated with each second object belonging to said set of second objects;
        in a case where to a single first object has a value or range of values of an additional predetermined or user selected property which corresponds to a set of second objects, causing said single first object to be associated with each second object belonging to said set of second objects;
    in response to an input, causing the first and second objects to change position relative to the user along the respective first and second looped paths such that at least one of the first objects is displayed with decreased prominence and causing each second object that is associated with the first object to be displayed such that the relative decrease in prominence of each second object, if any, is less than the relative decrease in prominence of the first object;
    wherein all of the second objects remain visible when at least one first object is displayed with decreased prominence.

2. A method according to claim 1, wherein causing an object to be displayed with decreased prominence comprises causing the object to appear smaller or to disappear and/or causing the object to be fully or partially obscured.

3. A method according to claim 1, comprising, in response to the input, causing at least one of the first objects to be displayed at a changed position and causing the at least one second object that is associated with the first object to be displayed at a position such that the association of the first and second objects is maintained.

4. A method according to claim 1, wherein the association is the result of relative positions of the first and second objects and/or a display element fully or partially linking the first and second objects.

5. A method according to claim 1, comprising, in response to an input in relation to one of the second objects, causing an indication emphasising the association of the second object with the one or more associated first objects to be displayed.

6. A method according to claim 1, comprising:
    causing a view of a three-dimensional arrangement of the first objects to be fully or partially displayed, the view being two- or three-dimensional; and
    in response to a further input, adjusting an angle of the view such that the first objects occupy less space on the display.

7. A method according to claim 1, comprising:
    in response to an input in relation to one of the first or second objects, changing the state of the first or second object respectively from an unselected state to a selected state;
    in response to the change in state of the first object, causing an indication thereof to be displayed in relation to the first object and/or the at least one associated second object; and,
    in response to the change in state of the second object, causing an indication thereof to be displayed in relation to the second object and/or the one or more associated first objects.

8. A method according to claim 1, comprising, in response to an input in relation to one of the first or second objects, respectively causing the first object or the second object and the one or more associated first objects to be displayed with increased prominence.

9. A method according to claim 1, wherein causing an object to be displayed with increased prominence comprises causing the object to appear or to appear larger, causing the object to be fully or partly unobscured, causing the object to be displayed more centrally, and/or causing the object to be displayed more in a foreground.

10. A method according to claim 1, comprising, in response to an input in relation to one of the plurality of first objects, causing a further plurality of first objects and a further at least two second objects to be displayed.

11. A method according to claim 1, further comprising, in response to an input, causing a further plurality of first objects and associated additional second objects to be displayed concurrently in at least one additional first looped path and one additional second looped paths, wherein the looped paths are concentric or coaxial or have parallel axes, wherein, in the case of parallel axes, the axis of a first looped path of the at least two respective looped paths is aligned with the first object in relation to which the input was made.

12. A method according to claim 1, comprising causing an element to be displayed, the element comprising an ordered arrangement of items, each item corresponding to one of the second objects or one of the first objects or the predetermined or user selected property thereof, and further comprising an indication of which one of the first or second objects is being displayed with most prominence.

13. A method according to claim 12, comprising, in response to an input in relation to the element, causing at least one of the second objects and the one or more associated first objects to be displayed at a changed position.

14. A method according to claim 1, comprising causing one or more lists or assemblies of words or symbols to be displayed, each list or assembly of words or symbols comprising a plurality of items, each item corresponding to one of the first objects or the predetermined or user selected property thereof.

15. A method according to claim 14, comprising, in response to an indication being displayed in relation to one of the first objects, causing an indication to be displayed in relation to the corresponding item.

16. A method according to claim 14, comprising, in response to an input in relation to one of the items, taking the same action as the action to be taken in response to an input in relation to the corresponding first object.

17. A method according to claim 7, comprising, in response to an input in relation to one of the first objects:
  causing a further plurality of first objects and a further at least two second objects to be displayed instead of the plurality of first objects and the at least two second objects; and
  causing a further list or assembly of words or symbols corresponding to the further plurality of first objects to be displayed in addition to the list or assembly of words or symbols corresponding to the plurality of first objects.

18. A method according to claim 1, comprising, in response to an input in relation to one of the first objects, determining a further one or more search terms based upon one or more properties of the first object, retrieving, from the database, a further plurality of data elements matching the search terms, and causing a further plurality of first objects and a further at least two second objects to be displayed, wherein each of the further plurality of first objects corresponds to one of the further plurality of data elements, wherein the plurality of first objects and the further plurality of first objects correspond to different levels in a hierarchical organisation of the data elements.

19. A method according to claim 1, wherein each second object provides an indication of a further one or more properties of the one or more associated first objects; and
  in response to the input, causing at least one of the first objects to be displayed at a changed position and causing at least one second object that is associated with the first object to be displayed at a position such that the association of the first and second objects is maintained.

20. A non-transitory computer-readable medium comprising a computer program comprising instructions which, when executed by a processor, cause the processor to perform a method according to claim 1.

21. User interface apparatus comprising:
  at least one hardware processor; and
  memory comprising a computer program,
  wherein the at least one processor and the memory and the computer program are configured to make the apparatus:
  cause a plurality of first objects to be displayed, the plurality of first objects arranged sequentially along a first looped path which is ordered according to a first predetermined or user selected property common to all of the plurality of first objects, the plurality of first objects being fully or partially displayed, wherein each first object is unique;
  cause at least two second objects to be displayed, the at least two second objects arranged sequentially along a second looped path, each second object corresponding to, and providing an indication of a value or a range of values of the first predetermined or user selected property, wherein each second object may also provide an indication of one or more additional predetermined or user selected properties, wherein the at least one processor and the memory and the computer program are configured to cause the at least two second objects to be displayed by:
    in a case where a single first object has a value or range of values of the first predetermined or user selected property which corresponds to a single second object, causing said single second object to be associated with said single first object;
    in a case where a set of two or more first objects have a value or range of values of the first predetermined or user selected property which corresponds to a single second object, causing said single second object to be associated with each of said set of two or more first objects;
    in a case where a single first object has a value or range of values of the first predetermined or user selected property which corresponds to a set of two of more second objects, causing said single first object to be associated with each second object belonging to said set of second objects;
    in a case where a single first object has a value or range of values of an additional predetermined or user selected property which corresponds to a set of second objects causing said single first object to be associated with each second object belonging to said set of second objects; and,
  in response to an input, to cause the first and second objects to change position relative to the user along the respective first and second looped paths such that at least one of the first objects is displayed with decreased prominence and causing each second object that is associated with the first object to be displayed such that the relative decrease in prominence of each second object, if any, is less than the relative decrease in prominence of the first object;

wherein all of the second objects remain visible when at least one first object is displayed with decreased prominence.

22. Apparatus according to claim 21, wherein the at least one processor and the memory and the computer program are configured to make the apparatus, in response to an input in relation to one of the first or second objects, respectively cause the first object or the second object and the one or more associated first objects to be displayed with increased prominence.

23. Apparatus according to claim 21, wherein the at least one processor and the memory and the computer program are configured to make the apparatus, in response to an input in relation to one of the plurality of first objects, cause a further plurality of first objects and a further at least two second objects to be displayed.

24. Apparatus according to claim 21, wherein the at least one processor and the memory and the computer program are configured to make the apparatus cause one or more lists or assemblies of words or symbols to be displayed, each list or assembly of words or symbols comprising a plurality of items, each item corresponding to one of the first objects or the predetermined or user selected property thereof.

25. A system comprising:
a server comprising a user interface apparatus comprising:
at least one hardware processor; and
memory comprising a computer program,
wherein the at least one processor and the memory and the computer program are configured to make the apparatus:
cause a plurality of first objects to be displayed, the plurality of first objects arranged sequentially along a first looped path which is ordered according to a first predetermined or user selected property common to all of the plurality of first objects, the plurality of first objects being fully or partially displayed, wherein each first object is unique;
cause at least two second objects to be displayed, the at least two second objects arranged sequentially along a second looped path, each second object corresponding to, and providing an indication of a value or a range of values of the first predetermined or user selected property, wherein each second object may also provide an indication of one or more additional predetermined or user selected properties, wherein the at least one processor and the memory and the computer program as configured to cause the at least two second objects to be displayed by:
in a case where a single first object has a value or range of values of the first predetermined or user selected property which corresponds to a single second object, causing said single second object to be associated with said single first object;
in a case where a set of two or more first objects have a value or range of values of the first predetermined or user selected property which corresponds to a single second object, causing said single second object to be associated with each of said set of two or more first objects;
in a case where a single first object has a value or range of values of the first predetermined or user selected property which corresponds to a set of two of more second objects, causing said single first object to be associated with each second object belonging to said set of second objects;
in a case where a single first object has a value or range of values of an additional predetermined or user selected property which corresponds to a set of second objects, causing said single first object to be associated with each second object belonging to said set of second objects;
in response to an input, to cause the first and second objects to change position relative to the user along the respective first and second looped paths such that at least one of the first objects is displayed with decreased prominence and causing each second object that is associated with the first object to be displayed such that the relative decrease in prominence of each second object, if any, is less than the relative decrease in prominence of the first object,
wherein all of the second objects remain visible when at least one first object is displayed with decreased prominence; and
a client device configured to communicate with the server via a network.

* * * * *

UNITED STATES PATENT AND TRADEMARK OFFICE
CERTIFICATE OF CORRECTION

PATENT NO. : 10,353,538 B2
APPLICATION NO. : 13/824568
DATED : July 16, 2019
INVENTOR(S) : Richard Gammons Page 1 of 1

It is certified that error appears in the above-identified patent and that said Letters Patent is hereby corrected as shown below:

In the Claims

Claim 1, Line 39, "to" should be deleted.

Claim 25, Line 39, "of" should be --or--.

Signed and Sealed this
Ninth Day of June, 2020

Andrei Iancu
*Director of the United States Patent and Trademark Office*